(12) United States Patent
Kondo et al.

(10) Patent No.: US 7,602,442 B2
(45) Date of Patent: Oct. 13, 2009

(54) APPARATUS AND METHOD FOR PROCESSING INFORMATION SIGNAL

(75) Inventors: Tetsujiro Kondo, Tokyo (JP); Seiji Wada, Kanagawa (JP); Hideo Nakaya, Kanagawa (JP); Takashi Tago, Tokyo (JP)

(73) Assignee: Sony Corporation, Tokyo (JP)

( * ) Notice: Subject to any disclaimer, the term of this patent is extended or adjusted under 35 U.S.C. 154(b) by 795 days.

(21) Appl. No.: 11/044,812

(22) Filed: Jan. 26, 2005

(65) Prior Publication Data

US 2005/0190296 A1 Sep. 1, 2005

(30) Foreign Application Priority Data

Jan. 28, 2004 (JP) ............................. 2004-020117

(51) Int. Cl.
*H04N 7/00* (2006.01)
(52) U.S. Cl. .................. 348/473; 348/474; 348/721; 348/734
(58) Field of Classification Search ................. 348/565, 348/720–721, 441, 563, 569, 473–474, 734; 712/35–36, 16–21, 25; 708/631–632, 523, 708/521; 709/400; *H04N 7/00*
See application file for complete search history.

(56) References Cited

U.S. PATENT DOCUMENTS 6,154,829 A * 11/2000 Mino et al. .................... 712/35

| | | | |
|---|---|---|---|
| 6,335,764 B1 * | 1/2002 | Hashimoto et al. | 348/565 |
| 6,501,441 B1 * | 12/2002 | Ludtke et al. | 345/1.1 |
| 6,900,844 B2 * | 5/2005 | Itaki et al. | 348/383 |
| 7,119,849 B2 * | 10/2006 | Yui et al. | 348/564 |

FOREIGN PATENT DOCUMENTS

| | | |
|---|---|---|
| JP | 8 265162 | 10/1996 |
| JP | 9 107547 | 4/1997 |
| JP | 2000 188752 | 7/2000 |
| JP | 2002 199359 | 7/2002 |

\* cited by examiner

*Primary Examiner*—Trang U Tran
(74) *Attorney, Agent, or Firm*—Frommer Lawrence & Haug LLP; William S. Frommer; Thomas F. Presson

(57) ABSTRACT

A plurality of processing portions sequentially performs a plurality of processing operation on an information signal. In this case, the plurality of processing portions is provided with a control-command-added information signal to which control commands are added for controlling the processing piece to be performed by some or all of the plurality of processing portions, for each predetermined unit of the information signal. The processing portions respectively separate the control command and the information signal from the control-command-added information signal. The information signal thus separated is then processed on the basis of the separated control command for controlling the processing to be performed by this processing portion. The separated control command is added to the post-processing information signal for each predetermined unit thereof, thereby determining a control-command-added information signal to be output.

11 Claims, 13 Drawing Sheets

FIG. 5A (SVa): | CMD | IMAGE FRAME | CMD | IMAGE FRAME |

FIG. 5B: COMMAND 1 | COMMAND 2 | COMMAND 3

FIG. 5C (DURING ADJUSTMENT):
- ID1 IP CONVERSION PROCESSING
- ID2 DRC PROCESSING r, z
- ID3 PICTURE-IN-PICTURE-SCREEN-PROCESSING, POSITION

FIG. 5D (ORDINARY TIME):
- ID1 IP CONVERSION PROCESSING
- ID2 DRC PROCESSING rs, zs
- ID3 ORDINARY PROCESSING

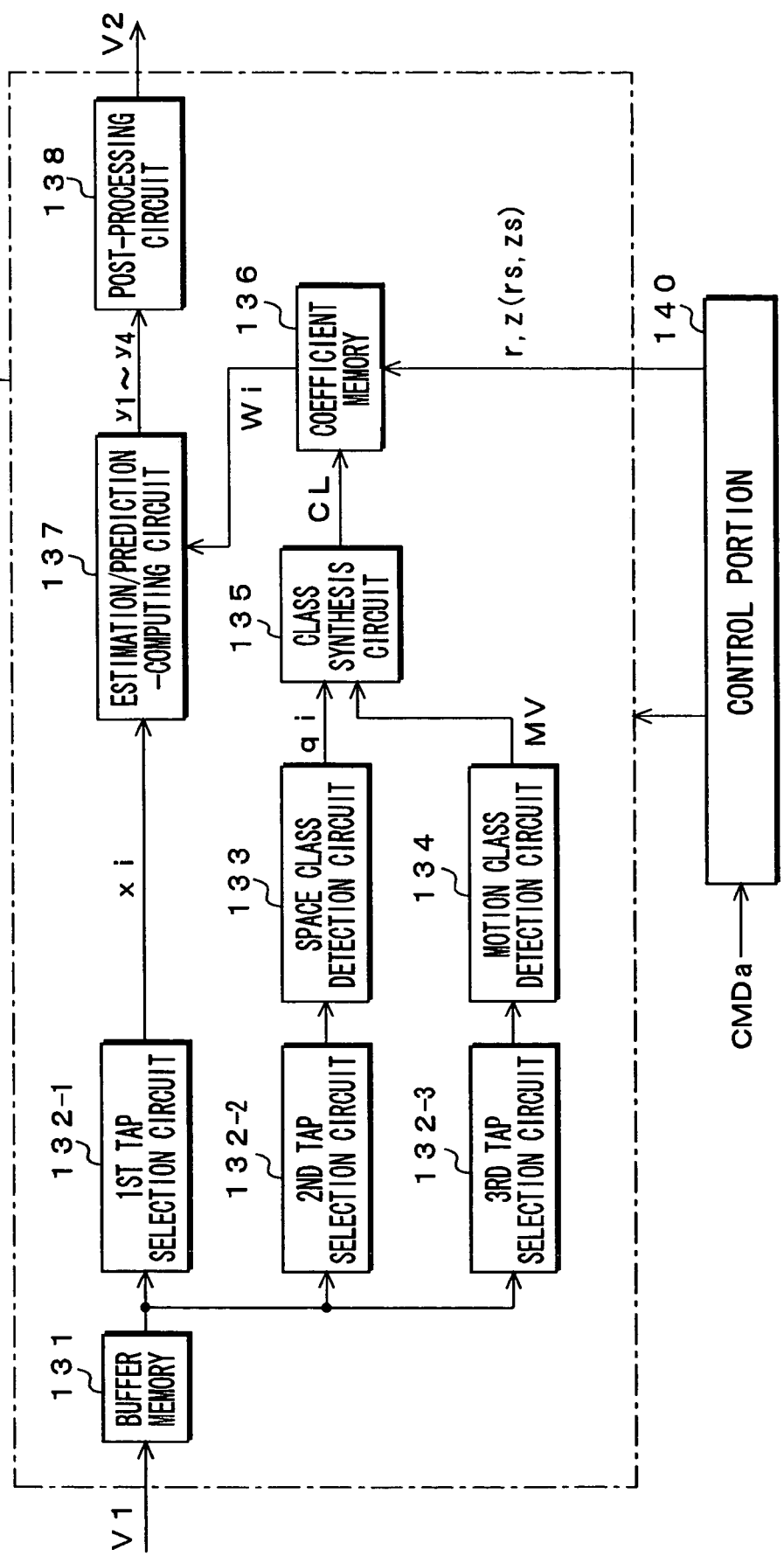

VERTICAL POSITION

HORIZONTAL POSITION

◯ V1 (525p)
○ V2 (1050p)

FIG. 8
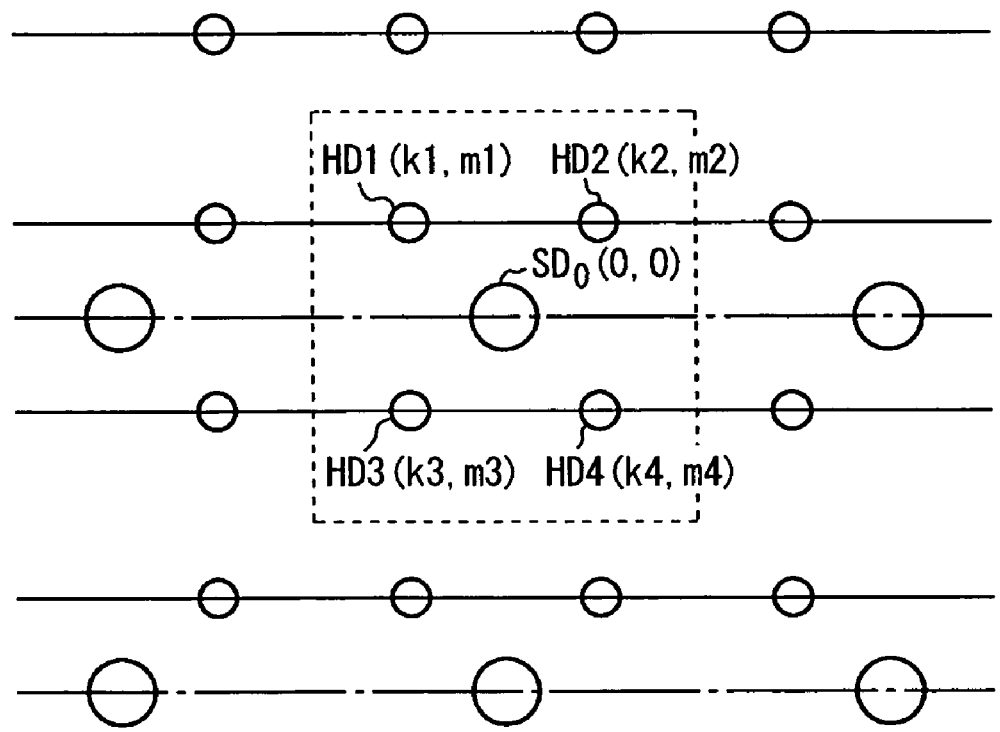
VERTICAL POSITION
HORIZONTAL POSITION
◯ V1 (525p)
○ V2 (1050p)

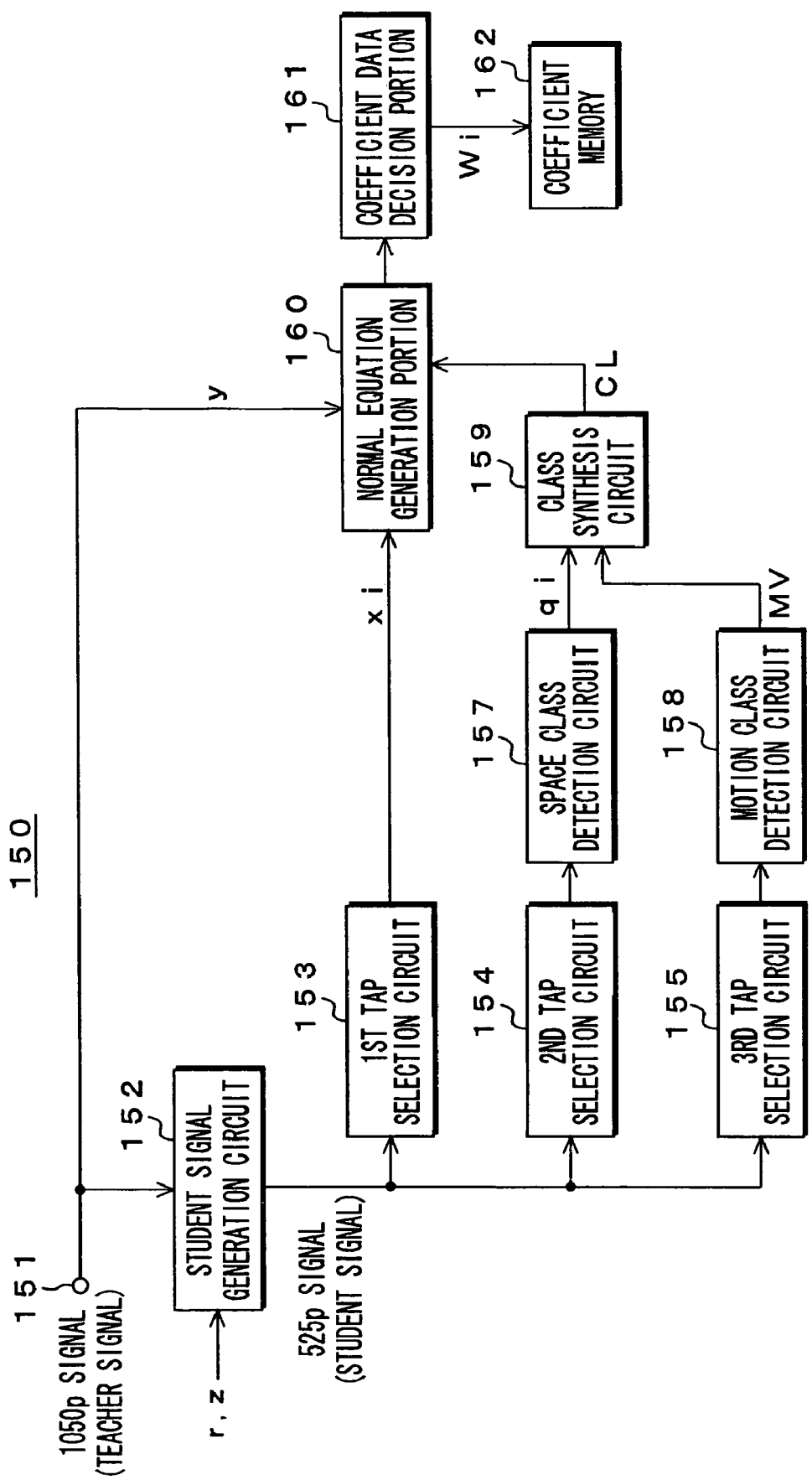

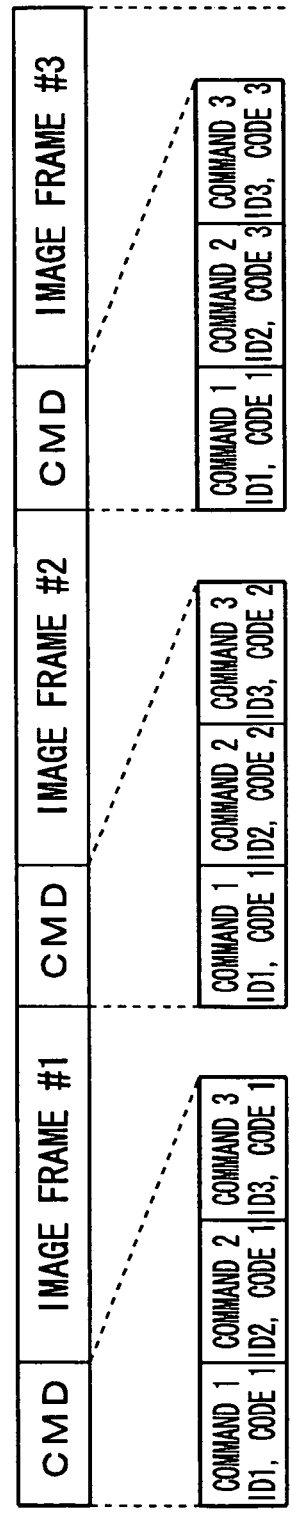
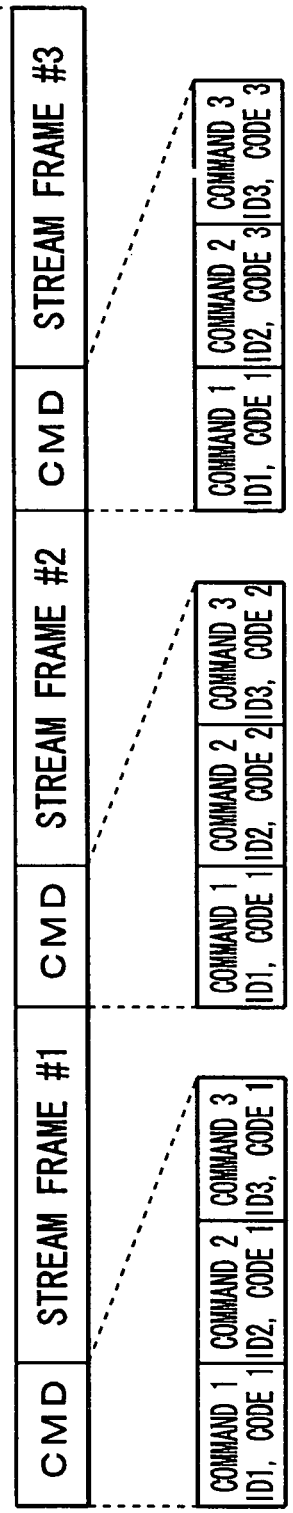
FIG. 16A (Vin)
FIG. 16B (SV1)
FIG. 16C (SV4)

APPARATUS AND METHOD FOR PROCESSING INFORMATION SIGNAL

BACKGROUND OF THE INVENTION

1. Field of the Invention

The present invention relates to an apparatus and method for processing an information signal. More particularly, it relates to an apparatus and a method each for processing an information signal in which a plurality of processing pieces on an information signal are sequentially performed.

2. Description of Related Art

An upgraded structure employing a processing portion (e.g., substrate, chip, or device) as a unit is capable of greatly changing an operation condition as a new processing portion replaces the existing one or is added thereto. For example, it may be considered that an apparatus for processing an image signal is realized by using this upgraded structure. In this case, it may be desired to change processing contents to be performed by a predetermined one of processing portions that constitute the apparatus for processing the image signal, for a predetermined unit, for example, for each frame. For example, in a case where the predetermined processing portion performs Picture-in-Picture-screen-processing, it is necessary to change a position where a Picture-in-Picture screen is displayed, for each frame. In this case, it is necessary to supply a control command to this predetermined processing portion in synchronization with a frame of an image signal which is input to this predetermined processing portion.

Japanese Patent Application Publication No. H07-28642 discloses a pipeline computing unit in which n number of stages of computing units are used to perform operations on input data according to a pipeline system (see FIGS. 1 and 3-5 of the above publication). In this pipeline computing unit, contents of processing to be performed by the n number of stages of computing units are changed on the basis of a reference signal such as a frame pulse synchronized with the input data. In this case, as it goes through the n number of stages of computing units to the latter ones, the processing data is delayed more, so that a timing for changing the processing contents by each of the computing units, that is, a timing for supplying the control command (instruction or coefficient) is adjusted by using a delay unit so that proper operational results may be obtained even after alteration of the processing contents.

In the pipeline computing unit described in the above publication, the timing for supplying the control command to each stage of the computing unit is adjusted by using a delay unit. Such a system is simple and preferable if operations are fixed as with the pipeline computing unit described in this publication. However, in the above apparatus for processing the image signal that has such an upgraded structure, each time a new processing portion replaces the existing one or is added thereto, it is necessary to, for example, readjust a timing for supplying the control command to the above predetermined processing portion. Thus, it is difficult to apply such the system to the upgraded-structure apparatus.

It is an object of the present invention to provide an apparatus and method for processing an information signal, in which a plurality of processing portions processes the information signal sequentially, thereby easily realizing alternation of the processing to be performed by a predetermined one of the processing portions for each predetermined unit.

SUMMARY OF THE INVENTION

According to an aspect of the invention, is provided an apparatus for processing an information signal to perform a plurality of processing pieces on the information signal sequentially. The apparatus comprises a plurality of processing portions each for performing the processing piece. The plurality of processing portions is supplied with a control-command-added information signal to which a control command is added. The control command controls the processing piece performed in at least one of the processing portions for each predetermined unit of the information signal. Such at least one of the processing portions process the information signal based on the control command, which is added to the control-command-added information signal, for controlling the processing piece performed in the processing portion itself.

According to another aspect of the invention, is provided a method for processing an information signal by which a plurality of processing portions sequentially processes the information signal. The method comprises a step of supplying the plurality of processing portions with a control-command-added information signal to which a control command is added. The control command controls a processing piece performed in at least one of the processing portions for each predetermined unit of the information signal. The method also comprises a step of, in said at least one of the processing portions, processing the information signal based on the control command, which is added to the control-command-added information signal, for controlling the processing piece performed in the processing portion itself.

In the present invention, for example, on the information signal, a plurality of processing portions sequentially performs a plurality of processing pieces. In this case, the plurality of processing portions is provided with a control-command-added information signal to which control commands are added for controlling the processing piece to be performed by some or all of this plurality of processing portions, for each predetermined unit of the information signal. For example, this control-command-added information signal is obtained in a control-command-adding portion. This control-command-adding portion adds a control command for controlling processing piece(s) to be performed in some or all of the plurality of processing portions, for each predetermined unit of the information signal. It is to be noted that the information signal includes an image signal, an audio signal. In the case of the image signal, the predetermined unit refers to, for example, each frame or each plurality of frames. In the case of the audio signal, the predetermined unit refers to, for example, each predetermined number of samples.

Some or all of the processing portions respectively process the information signal based on the control command(s), which is (are) added to the control-command-added information signal, for controlling the processing to be performed by the processing portion itself. For example, some or all of the processing portions respectively separates the control command and the information signal from the control-command-added information signal, so that the information signal thus separated is processed on the basis of the separated control command for controlling the processing to be performed by this processing portion, to add the separated control command to the post-processing information signal, for each predetermined unit of the information signal, thereby obtaining a control-command-added information signal to be output.

In this case, when, for example, obtaining the control-command-added information signal to be output, the separated control commands other than the one for controlling the processing to be performed by the processing portion itself are added to the post-processing information signal. This holds true with such a case that the control command for controlling processing to be performed by the processing portion itself is unnecessary in subsequent processing. Also, for example, when obtaining the control-command-added information signal to be output, all of the separated control commands are added to the post-processing information signal. This holds true with such a case that the control command for controlling processing to be performed by this processing portion itself is necessary in the subsequent processing.

In such a manner, a plurality of processing portions is supplied with a control-command-added information signal to which the control command for controlling processing to be performed by some or all of this plurality of processing portions is added. A predetermined one of the processing portions then performs processing based on the control command(s), which is (are) added to the information signal, for controlling a processing piece to be performed by the processing portion itself, for each predetermined unit of the information signal. Therefore, it is possible to realize alteration of processing to be performed at a predetermined one of the processing portions, for each predetermined unit.

According to further aspect of the invention, is provided an apparatus for processing an information signal. The apparatus comprises separation means for separating a control command and an information signal from a control-command-added information signal to obtain them for each predetermined unit of the information signal. The apparatus also comprises processing means for processing the information signal separated by the separation means, based on the control command, which is separated by the separation means, for controlling a processing piece to be performed by the processing means itself.

According to still further aspect of the invention, is provided a method for processing an information signal. The method comprises a separation step for separating a control command and an information signal from a control-command-added information signal for each predetermined unit of the information signal. The method also comprises a processing step for processing the information signal separated by the separation step, based on the control command, which is separated by the separation step, for controlling a processing piece to be performed by the processing step itself.

In the present invention, the control command and the information signal are separated from the control-command-added information signal. The information signal thus separated is processed on the basis of the separated control command for controlling processing to be performed by its own processing portion. Then, for each predetermined unit of the post-processing information signal, the separated control command is added, to obtain a control-command-added information signal to be output. For each predetermined unit of the information signal, a processing piece can be performed on the basis of the added control command for controlling processing to be performed by its own processing portion, thereby easily realizing processing alteration for each predetermined unit.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIGS. 5A-5D are explanatory diagrams each for showing a configuration of an image signal with a control command;

FIG. 6 is a block diagram for showing a configuration of an image processing portion in a DRC portion;

FIG. 8 is a diagram for showing a shift in phase of four pixels in a unit pixel block of the 1050p signal from a central predictive tap in the 525p signal;

FIG. 10 is a block diagram for showing a configuration of a coefficient data generator;

FIGS. 16A-16C are diagrams each for explaining encode processing;

DESCRIPTION OF THE PREFERRED EMBODIMENTS

Figure 1:
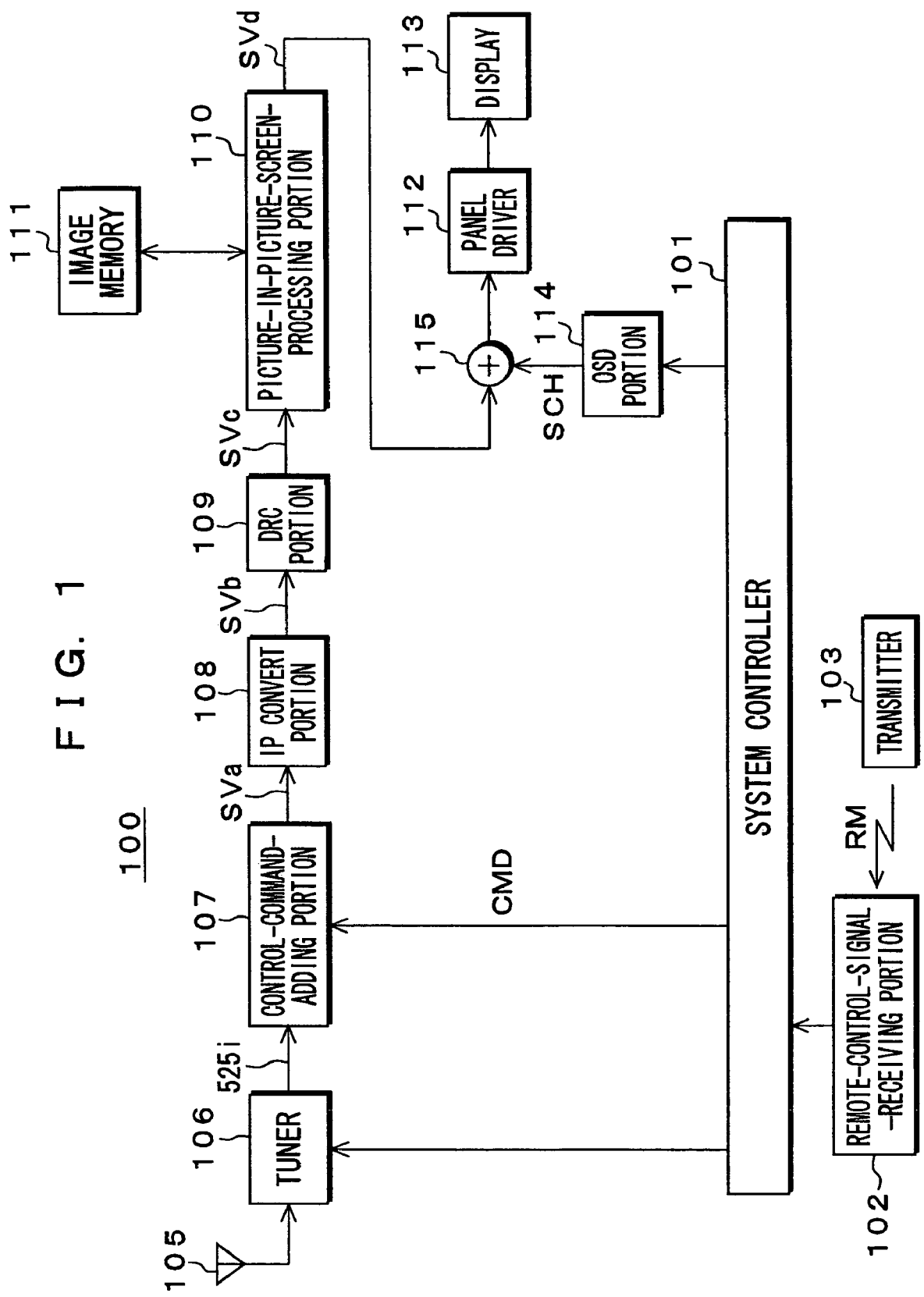
FIG. 1 is a block diagram for showing a configuration of an embodiment of an image display device according to the invention.

The following will describe embodiments of the present invention with reference to drawings. FIG. 1 shows a configuration of an embodiment of an image display device 100 according to the invention.

This image display device 100 has a function to obtain a 525i signal from a broadcast signal and convert this 525i signal into a 525p signal and then this 525p signal into a 1050p signal so that an image due to this 1050p signal may be displayed on it. It is to be noted that the 525i signal refers to an interlace-type image signal having 525 lines, the 525p signal refers to a progressive-type image signal having 525 lines, and the 1050p signal refers to a progressive-type image signal having 1050 lines.

Figure 2:
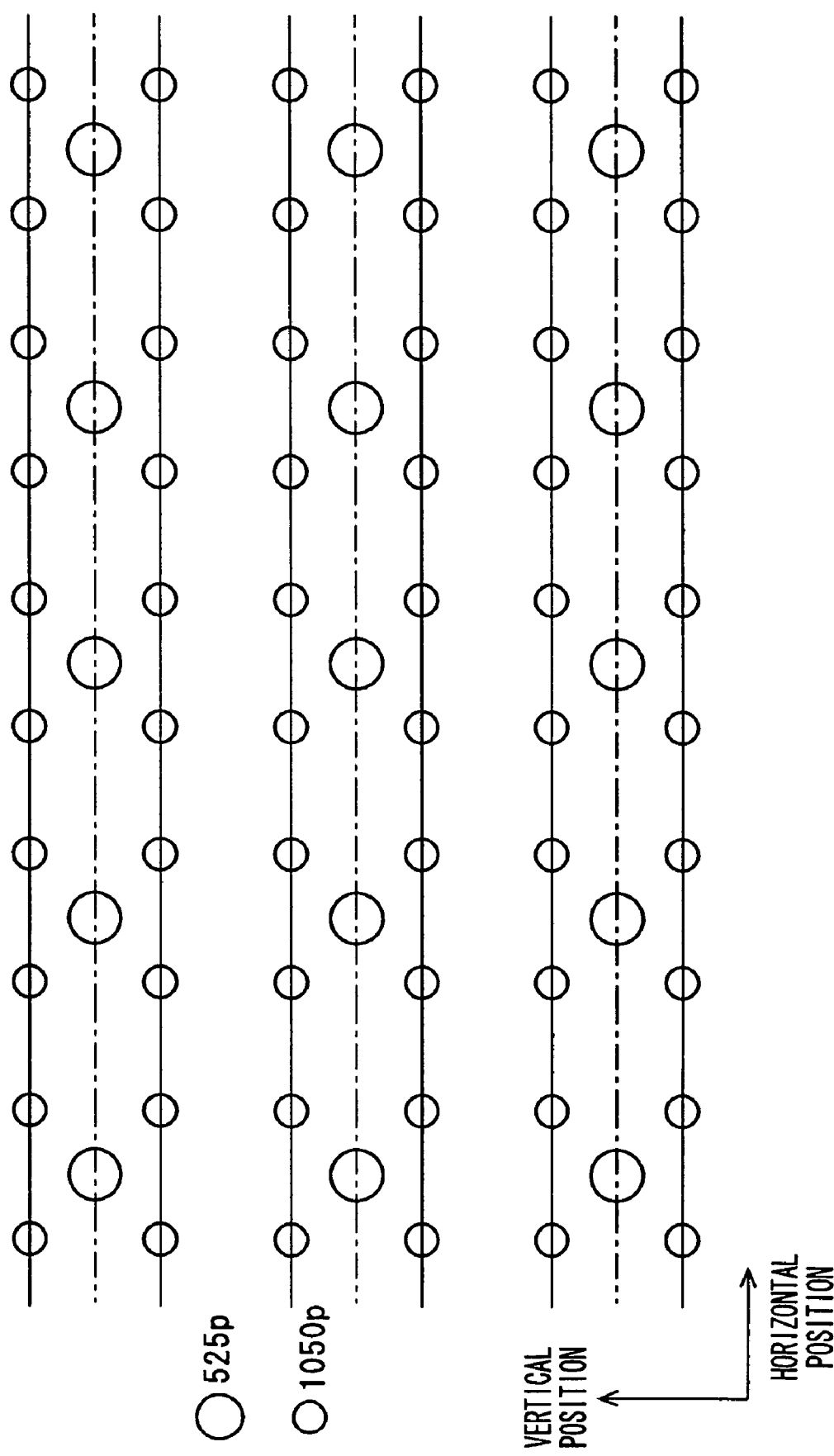
FIG. 2 is a diagram for showing a pixel position relationship between a 525p signal and a 1050p signal.

FIG. 2 shows a space-directional (vertical and horizontal) pixel position relationship between the 525p signal and the 1050p signal, in which a larger dot represents a pixel of the 525p signal and a smaller dot represents that of the 1050p signal. As can be seen from FIG. 2, the 1050p signal has twice the number of lines of the 525p signal and also twice the number of pixels of the 525p signal per line.

Referred back to FIG. 1, the image display device 100 is equipped with a microcomputer and comprises a system controller 101 for controlling operations of the device as a whole and a remote-control-receiving portion 102 for receiving a remote-control signal RM. The remote-control-receiving portion 102 is connected to the system controller 101, to receive the remote-control signal RM which is output from a remote-control transmitter 103 in response to a user's operation and supplies the system controller 101 with an operation signal that corresponds to this remote-control signal RM.

The image display device 100 further comprises a receiving antenna 105 and a tuner 106. The tuner 106 performs channel select processing etc. on a broadcast signal acquired by this receiving antenna 105, to obtain a 525i signal that is an image signal of a user-desired channel.

The image display device 100 further comprises a control-command-adding portion 107. This control-command-adding portion 107, for the frame-specific 525i signal output from the tuner 106, adds a control command CMD for controlling processing to be performed by an IP convert portion 108, a digital reality creation (DRC) portion 109, and a Picture-in-Picture-screen-processing portion 110, respectively, which will be described later, thereby generating a control-command-added image signal SVa. In this case, the control-command-adding portion 107 is supplied with the control command CMD from the system controller 101. It is to be noted that "one frame" used herein refers to one frame used in a progressive-type signal, which will be described later, such as the 525p signal, 1050p signal, etc. while it actually corresponds to one field in the 525i signal.

The image display device 100 further comprises the IP convert portion 108, the DRC portion 109, the Picture-in-Picture-screen-processing portion 110, and an image memory 111. The IP convert portion 108 receives the control-command-added image signal SVa output from the control-command-adding portion 107 and, from this image signal SVa, separates a control command and an image signal, respectively, for each frame to obtain them. Further, for each frame, this IP convert portion 108 converts this 525i-type image signal into a 525p-type signal based on a control command for controlling processing to be performed by its own processing portion, which such the separated and obtained control commands contain. Further, for each frame, this IP convert portion 108 adds, to the post-processing image signal, those separated and obtained control commands other than the one for controlling processing to be performed by its own processing portion, that is, those control commands to be used for controlling processing to be performed by the other processing portions, thereby generating a control-command-added image signal SVb to be output.

The DRC portion 109 receives the control-command-added image signal SVb output from the IP convert portion 108 and, from this image signal SVb, separates a control command and an image signal, respectively, to obtain them for each frame. Further, for each frame, this DRC portion 109 converts this 525p-type image signal into a 1050p-type signal based on a control command for controlling processing to be performed by its own processing portion, which such the separated and obtained control commands contain. Further, for each frame, this DRC portion 109 adds, to the post-processing image signal, those separated and obtained control commands other than the one for controlling processing to be performed by its own processing portion, that is, those control commands to be used for controlling processing to be performed by the other processing portions, thereby generating a control-command-added image signal SVc to be output.

The user can adjust a resolution and a noise cancellation degree of an image to be displayed on a screen of a display, which will be described later. The DRC portion 109 generates data of pixels that constitute a 1050p signal by using an estimation equation and coefficient data used in the estimation equation can be changed to adjust the resolution and the noise cancellation degree, which will be described later. A control command for controlling processing to be performed by this DRC portion 109 includes parameters r and z that indicate the resolution and the noise cancellation degree, respectively.

To adjust a resolution and a noise cancellation degree, six kinds of the parameters r and z indicative of the resolution and the noise cancellation degree, respectively, and included in a control command for each frame to control processing to be performed by this DRC portion 109 are repeated sequentially. In this case, Picture-in-Picture screen images due to a 1050p signal generated by using coefficient data that corresponds to the six kinds of the parameters r and z are displayed alongside on the display screen. The user can operate the remote-control transmitter 103 to select his desired one of the Picture-in-Picture screen images on the display screen and also his desired resolution and noise cancellation degree.

In a normal operation after the user has thus selected his desired resolution and noise cancellation degree, the parameters r and z indicative of the resolution and the noise cancellation degree included in a frame-specific control command for controlling the processing to be performed by the DRC portion 109 now indicate the user selected resolution and noise cancellation degree, respectively. Therefore, in the normal operation, a resolution and a noise cancellation degree of an image displayed on the display screen are those selected by the user at the time of adjustment.

The Picture-in-Picture-screen-processing portion 110 receives the control-command-added image signal SVc output from the DRC portion 109 and, frame this image signal SVc, separates a control command and an image signal for each SD frame to obtain them. Further, for each frame, this Picture-in-Picture-screen-processing portion 110 generates and outputs an image signal SVd for displaying an image on the display screen from the image signal thus separated and obtained, based on a control command for controlling processing to be performed by its awn processing portion, which such the separated and obtained control commands contain.

The control command for controlling the processing to be performed by this Picture-in-Picture-screen-processing portion 110 includes a command for instructing normal processing or a command for instructing Picture-in-Picture-screen-processing and, if the command for instructing Picture-in-Picture-screen-processing is included, information that indicates a Picture-in-Picture screen position. To adjust a resolution and a noise cancellation degree as described above, information indicative of the Picture-in-Picture screen processing and information indicative of a Picture-in-Picture screen position are included in the frame-specific control command for controlling processing to be performed by this Picture-in-Picture-screen-processing portion 110.

In this case, the information of Picture-in-Picture screen position comprises information on sequential repetitions of six positions that correspond to the above-mentioned six kinds of parameters r and z, respectively, for each frame. Further, for each frame, the Picture-in-Picture-screen-processing portion 110 writes a sixth (⅙) region of the separated and obtained image signal (e.g., a left top region when the screen is divided by three horizontally and by two vertically) to a memory region, which corresponds to the information of Picture-in-Picture screen position, of the image memory 111.

Further also, for each frame, the Picture-in-Picture-screen-processing portion 110 retrieves the image signal by one frame from the image memory 111 and outputs it as the image signal SVd used to display an image on the display screen. Accordingly, Picture-in-Picture screen images due to the 1050p signal generated by using the coefficient data that corresponds to the six kinds of parameters r and z are displayed alongside on the display screen.

Also, in a normal operation after the user has selected his desired resolution and noise cancellation degree, the control command for controlling processing to be performed by this Picture-in-Picture-screen-processing portion 110 includes information indicative of normal processing. In this case, for each frame, the Picture-in-Picture-screen-processing portion 110 writes the separated and obtained image signal to the image memory 111 and retrieves the image signal by one frame from the image memory 111 and outputs it as the image signal SVd to be used to display an image on the display screen. Accordingly, an ordinary image is displayed on the display screen at a resolution and a noise cancellation degree selected by the user.

The image display device 100 further comprises a panel driver 112 and a display 113. The display 113 is, for example, a liquid crystal display (LCD) or a flat panel display constituted of a plasma display panel (PDP). The panel driver 112 drives the display 113 based on the image signal SVd output from the Picture-in-Picture-screen-processing portion 110, to display an image due to the image signal SVd on a screen of this display 113.

The image display device 100 further comprises an on-screen display (OSD) potion 114 and a synthesizer 115. The OSD portion 114 generates a display signal SCH for displaying characters, figures and the like on the screen of the display 113 under the control of the system controller 101. The synthesizer 115 synthesizes the display signal SCH generated by the OSD portion 114 with the image signal SVd output from the Picture-in-Picture-screen-processing portion 110 and supplies a result of this synthesis to the panel driver 112. For example, to adjust a resolution and a noise cancellation degree as described above, the OSD portion 114 generates a display signal SCH for displaying a frame that encloses Picture-in-Picture screen images displayed alongside on the screen of the display 113 and numbers for identifying these Picture-in-Picture screen images.

Figure 3:
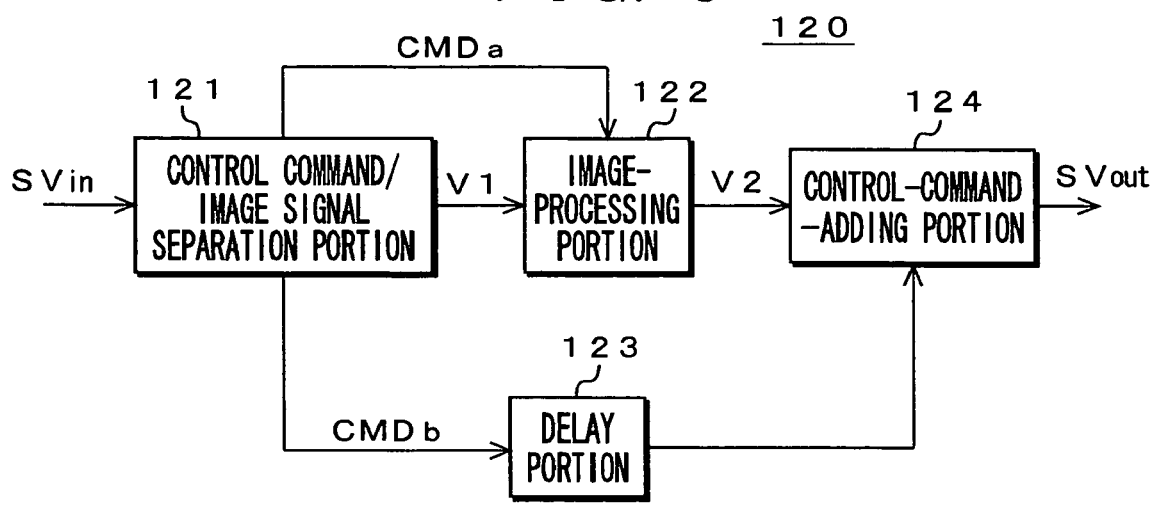
FIG. 3 is a block diagram for showing a configuration of a processing portion.

The following will describe a processing portion 120, which provides a basis for the IP convert portion 108, the DRC portion 109, and the Picture-in-Picture-screen-processing portion 110. FIG. 3 shows a configuration of this processing portion 120.

The processing portion 120 comprises a control command/image signal separation portion 121. This control command/image signal separation portion 121 receives a control-command-added image signal SVin to which a control command is added for each fame of an image signal and, from this image signal SVin, separates the control command and the image signal for each frame to obtain them.

The processing portion 120 further comprises an image-processing portion 122, a delay portion 123, and a control-command-adding portion 124. For each frame, the image-processing portion 122 processes an image signal V1 separated by the separation portion 121 based on a control command CMDa separated by the separation portion 121 and used to control processing to be performed by its own processing portion. The delay portion 123 delays a control command CMDb separated by the separation portion 121 and used to control processing to be performed by the other processing portions, by as much as a processing delay through the above-described image-processing portion 122. The control-command-adding portion 124, for each frame, adds the control command CMDb delayed by the delay portion 123 to one frame of the image signal V2 output from the image processing portion 122, to obtain a control-command-added image signal SVout to be output. It is to be noted that, as described later, the separation portion 121 distinguishes between the control command CMDa for controlling processing to be performed by its own processing portion and the control command CMDb for controlling processing to be performed by the other processing portions, based on an identifier contained in the control command for each of the processing portions.

The following will describe operations of the processing portion 120 shown in FIG. 3. The control-command-added image signal SVin is supplied to the control command/image signal separation portion 121. For each frame, this separation portion 121 separates from the image signal SVin a control command and an image signal to obtain them. The image signal V1 and the control command CMDa for controlling processing to be performed by its own processing portion that have been separated by this separation portion 121 are each supplied to the image-processing portion 122.

For each frame, the image-processing portion 122 processes the image signal V1 based on the control command CMDa. The image signal V2 after being processed by this image-processing portion 122 is supplied to the control-command-adding portion 124. Further, the control command CMDb separated by the separation portion 121 and used to control processing to be performed by the other processing portions is delayed at the delay portion 123 by as much as a processing delay through the image-processing portion 122 and then supplied to the control-command-adding portion 124.

For each frame, the control-command-adding portion 124 adds the control command CMDb delayed by the delay portion 123 to one frame of the image signal V2 output from the image-processing portion 122, to obtain a control-command-added image signal SVout to be output. This image signal SVout provides an output signal for the processing portion 120.

Figure 4:
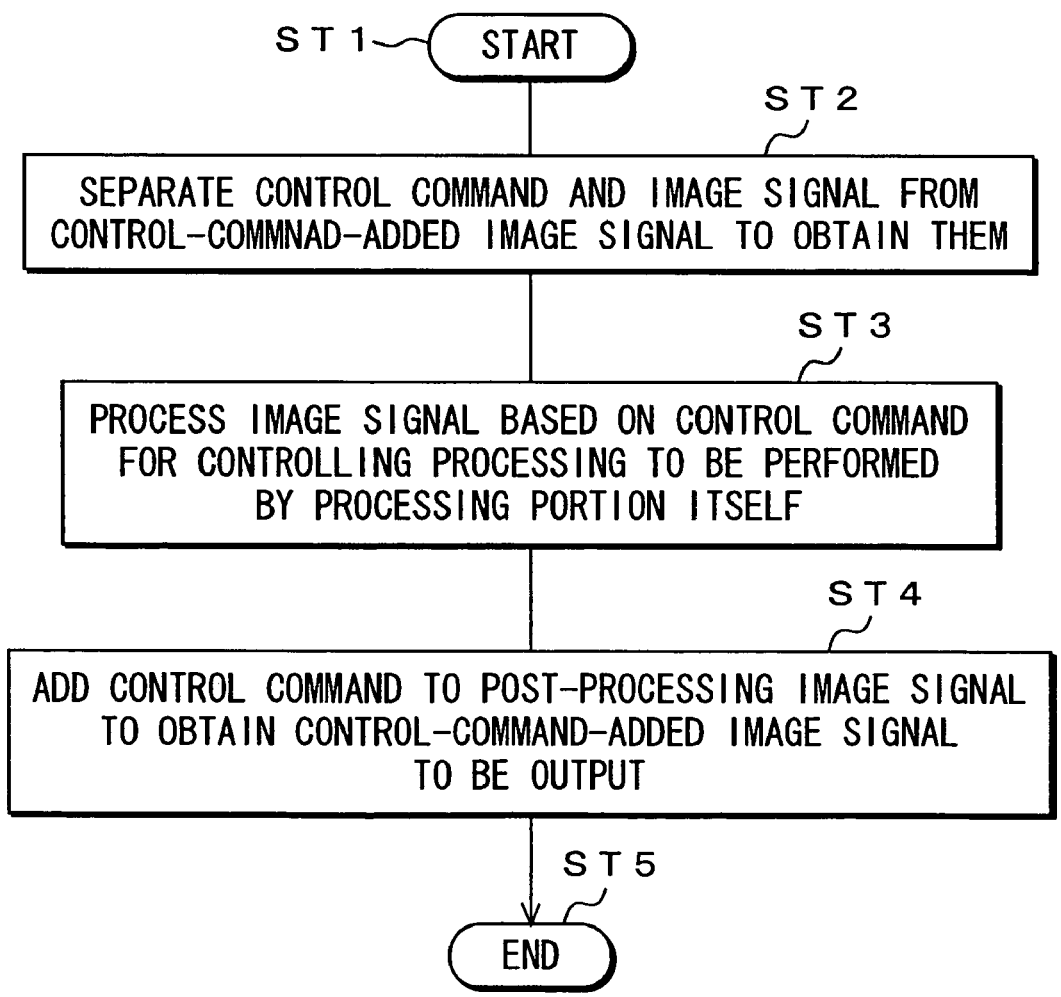
FIG. 4 is a flowchart for showing a processing procedure (for one frame) at the processing portion.

A flowchart of FIG. 4 shows a processing procedure for one frame of the control-command-added image signal SVin at the processing portion 120 shown in FIG. 3.

First, the process starts at step ST1 and, at step ST2, separates a control command and an image signal from the control-command-added image signal SVin to obtain them. At step ST3, the process processes the image signal V1 separated at step ST2, based on the control command CMDa separated at step ST2 and used to control processing to be performed by processing portion itself. At step ST4, the process adds the control command CMDb separated at step ST1 and used to control processing to be performed by the other processing portions, to the image signal V2 after being processed at step ST3, thereby obtaining a control-command-added image signal SVout to be output. At step ST5, the process ends.

FIG. 5A shows the control-command-added image signal SVa output from the control-command-adding portion 107. This image signal SVa has the control commands CMD added to it which control processing to be performed by the IP convert portion 108, the DRC portion 109, and the Picture-in-Picture-screen-processing portion 110 for the frame-specific image signal as described above. An image frame in FIG. 5A represents one frame of an image signal. The frame-specific control command CMD is comprised of command 1 for controlling processing at the IP convert portion 108, command 2 for controlling processing at the DRC portion 109, and command 3 for controlling processing at the Picture-in-Picture-screen-processing portion 110 as shown in FIG. 5B.

As shown in FIGS. 5C and 5D, command 1 includes identifier ID1 which identifies a control command for the IP convert portion 108 and a command which instructs IP conversion processing, regardless of whether a resolution and a noise cancellation are adjusted or it is in a normal operation after they are already selected.

Command 2 includes, when a resolution and a noise cancellation degree are adjusted, identifier ID2 which identifies a control command for the DRC portion 109, a command which instructs DRC processing, and parameters r and z that indicate the resolution and the noise cancellation degree, respectively, as shown in FIG. 5C. In this case, as described above, six kinds of parameters r and z included in the frame-specific control command and indicative of the resolution and the noise cancellation degree, respectively, are repeated sequentially. Further, in a normal operation after the resolution and the noise cancellation degree are selected, command 2 includes identifier ID2, a command which instructs DRC processing, and parameters rs and zs that indicate selected resolution and noise cancellation degree, respectively, as shown in FIG. 5D.

Command 3 includes, when a resolution and a noise cancellation degree are adjusted, identifier ID3 which identifies a control command for the Picture-in-Picture-screen-processing portion 110, a command which instructs Picture-in-Picture-screen-processing, and information indicative of a Picture-in-Picture screen position, as shown in FIG. 5C. In this case, as described above, the information included in the frame-specific control command and indicative of a Picture-in-Picture screen position has sequentially repeated six positions that correspond to six kinds of parameters r and z respectively. Further, in a normal operation after the resolution and the noise cancellation degree are selected, command 3 includes identifier ID3 and a command which instructs normal processing as shown in FIG. 5D.

As described above, the processing portion 120 shown in FIG. 3 provides a basis for the IP convert portion 108, the DRC portion 109, and the Picture-in-Picture-screen-processing portion 110. Each of these processing portions is further described below.

The IP convert portion 108 will be described as follows. In this IP convert portion 108, the image-processing portion 122 converts the image signal V1, which is a 525i signal, into the image signal V2, which is a 525p signal. In this case, an increase in the number of lines is given by, for example, linear interpolation. Further, in this IP convert portion 108, a control-command-added image signal SVin supplied to the control command/image signal separation portion 121 corresponds to the image signal SVa output from the control-command-adding portion 107, whose frame-specific control command CMD is comprised of the command 1, the command 2, and the command 3 (see FIGS. 5A and 5B). In this case, the control command CMDa for controlling processing to be performed by processing portion itself is command 1 and the control commands CMDb for controlling processing to be performed by the other processing portions are the commands 2 and 3. For each frame, the control-command-adding portion 124 adds the commands 2 and 3 separated by the separation portion 121 as the control command CMD to one frame of the image signal V2 output from the image-processing portion 122, thereby forming the control-command-added image signal SVout to be output.

The DRC portion 109 will be described as follows. In this DRC portion 109, the image-processing portion 122 converts the image signal V1, which is a 525p signal, into the image signal V2, which is a 1050p signal. Further, in this DRC portion 109, the control-command-added image signal SVin supplied to the control command/image signal separation portion 121 corresponds to the image signal SVb output from the IP convert portion 108, whose frame-specific control command CMD is comprised of the command 2 and the command 3. In this case, the control command CMDa for controlling processing to be performed by processing portion itself is the command 2 and the control command CMDb for controlling processing to be performed by the other processing portions is the command 3. For each frame, the control-command-adding portion 124 adds the command 3 separated by the separation portion 121 as the control command CMD to one frame of the image signal V2 output from the image-processing portion 122, thereby forming the control-command-added image signal SVout to be output.

The Picture-in-Picture-screen-processing portion 110 will be described as follows. In this Picture-in-Picture-screen-processing portion 110, the image-processing portion 122 performs Picture-in-Picture-screen-processing or ordinary processing on the image signal V1, which is a 1050p signal. In the Picture-in-Picture screen processing, as described above, for each frame, it writes a portion of a sixth ($\frac{1}{6}$) region of the image signal V1 to a memory region corresponding to the information on Picture-in-Picture screen position in the image memory 111 and also retrieves one frame of the image signal stored in the image memory 111, to obtain the image signal V2. Further, in ordinary processing, as described above, for each frame, it writes the image signal V1 into the image memory 111 and also retrieves one frame of the image signal stored in the image memory 111, to obtain the image signal V2.

Further, in this Picture-in-Picture-screen-processing portion 110, the control-command-added image signal SVin supplied to the control command/image signal separation portion 121 corresponds to the image signal SVc output from the DRC portion 109, whose frame-specific control command CMD is comprised of the command 3 only. In this case, the control command CMDa for controlling processing to be performed by processing portion itself is the command 3, while there is no control command CMDb for controlling processing to be performed by the other processing portions. This Picture-in-Picture-screen-processing portion 110 is not provided with the delay portion 123 and the control-command-adding portion 124 and so outputs the image signal V2 output from the image-processing portion 122 directly as the image signal SVd.

The following will describe a configuration of the image-processing portion 122 in the DRC portion 109 with reference to FIG. 6. This image-processing portion 122 comprises a main processing portion 130 and a control portion 140 for controlling operations of this main processing portion 130.

The control portion 140 is supplied with the control command CMDa for controlling processing to be performed by processing portion itself. This control command CMDa includes a command that instructs DRC processing and parameters r and z (rs and rs) that indicate a resolution and a noise cancellation, respectively, as described above (see FIGS. 5C and 5D).

Further, the main processing portion 130 comprises a buffer memory 131 for storing the image signal V1 (525p signal) temporarily and first through third tap selection circuits $132_{-1}$ through $132_{-3}$ each for selectively taking out and outputting multiple items of pixel data positioned in a periphery of a target position in the image signal V2 (1050p signal), based on the image signal V1 stored in this buffer memory 131.

Figure 7A:
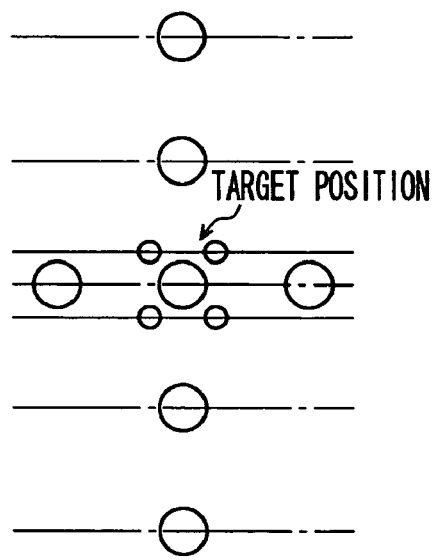
FIG. 7A is a diagram for showing one example of a class tap.
Figure 7B:
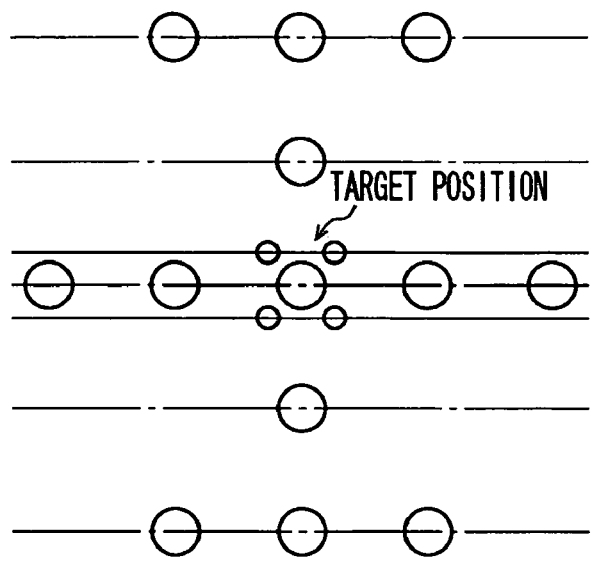
FIG. 7B is a diagram for showing one example of a predictive tap.

The first tap selection circuit $132_{-1}$ selectively takes out multiple items of pixel data to be used in prediction, as predictive tap data. The second tap selection circuit $132_{-2}$ selectively takes out multiple items of pixel data to be used in class classification that corresponds to a level distribution pattern, as space class tap data. FIGS. 7A and 7B show one example of a space class tap and that of a predictive tap, respectively.

The third tap selection circuit $132_{-3}$ selectively takes out multiple items of pixel data to be used in class classification that corresponds to motion, as motion class tap data. It is to be noted that in a case where a space class is determined by using pixel data that belongs to a plurality of fields, motion information is contained in this space class also.

The main processing portion 130 further comprises a space class detection circuit 133 for detecting a level distribution pattern of multiple items of pixel data as data of a space class tap to be selectively taken out by the second tap selection circuit $132_{-2}$, detecting a space class based on this level distribution pattern, and outputting information of this class.

The space class detection circuit 133 performs such operations as to compress, for example, each 8-bit pixel data into 2-bit data. Then, compressed data that corresponds to each of the items of pixel data is output from the space class detection circuit 133 as class information of a space class. In the present embodiment, data is compressed according to adaptive dynamic range coding (ADRC). It is to be noted that as data compressing means, differential pulse code modulation (DPCM), vector quantization (VQ), etc, may be used besides ADRC.

Although originally, ADRC is an adaptive re-quantization method developed for high-performance coding to be used in a video cassette recorder (VCR), it is capable of efficiently representing a local pattern of a signal level by using a short word length and so well suited for use in the above-described data compression. If ADRC is employed when a maximum value among multiple items of pixel data is MAX, a minimum value among them is MIN, a dynamic range of the multiple items of pixel data is DR (=MAX−MIN+1), and the number of re-quantization bits is P, for each item of pixel data k, by computing Equation (1), a re-quantization code qi can be obtained as compressed data.

$$qi=[(ki-\text{MIN}+0.5)*2^P/DR] \quad (1)$$

where, in Equation (1), [ ] means that contents therein are to be discarded. If Na items of pixel data are given as space class tap data, i=1 through Na.

The main processing portion 130 further comprises a motion class detection circuit 134 for detecting a motion class for indicating a degree of, mainly, motion from multiple items of pixel data given as data of a motion class tap selectively taken out by the third tap selection circuit $132_{-3}$ and outputting information of this class.

This motion class detection circuit 134 calculates inter-frame differences from multiple items of pixel data mi and ni selectively taken out by the third tap selection circuit $132_{-3}$ and performs threshold value processing on an average value of absolute values of these differences, thereby detecting a motion class, which is an index of motion. That is, the motion class detection circuit 134 calculates an average value AV of absolute values of differences by using Equation (2). If, for example, 12 items of pixel data m1-m6 and n1-n6 are taken out by the third tap selection circuit $132_{-3}$, Nb in Equation (2) is 6.

$$AV = \frac{\sum_{i=1}^{Nb} |mi-ni|}{Nb} \quad (2)$$

Then, at the motion class detection circuit 115, an average value AV thus calculated is compared to one or a plurality of threshold values to obtain class information MV of a motion class. For example, in a case where three threshold values of th1, th2, and th3 (th1<th2<th3) to detect four motion classes, if AV≦th1, MV=0 is given, if th1<AV≦th2, MV=1 is given, if th2<AV≦th3, MV=2 is given, and th3<AV, MV=3 is given.

The main processing portion 130 further comprises a class synthesis circuit 135. This class synthesis circuit 135 obtains a class code CL indicative of a class to which pixel data of a target position in the image signal V2 belongs, based on a re-quantization code qi as class information of a space class output from the space class detection circuit 133 and class information MV of a motion class output from the motion class detection circuit 134. This class synthesis circuit 135 computes a class code CL by using Equation (3).

$$CL = \sum_{i=1}^{Na} qi(2^P)^{i-1} + MV \cdot (2^P)^{Na} \quad (3)$$

where in Equation (3), Na indicates the number of multiple items of pixel data given as data of a space class tap and P indicates the number of re-quantization bits in ADRC.

The main processing portion 130 further comprises a coefficient memory 136. This coefficient memory 136 stores, for each class, items of coefficient data Wi (i=1 to n) which are used in an estimation equation used in an estimation/prediction-computing circuit 137, which will be described later. In this case, coefficient data Wi for each class is comprised of items of coefficient data Wi that correspond to the above-described six kinds of parameters r and z, respectively. This coefficient data Wi is information used to convert the image signal V1 (525p signal) into the image signal V2 (1050p signal).

To convert a 525p signal into a 1050p signal, it is necessary to obtain four pixels of the 1050p signal corresponding to each of the pixels of the 525p signal in each frame (see FIG. 2). In this case, the four pixels in a 2×2 unit pixels block that constitutes the 1050p signal in each frame have different shifts in phase with respect to a central predictive tap. FIG. 8 shows a shift in phase of four pixels $HD_1$ to $HD_4$ in a 2×2 unit pixels block constituting the image signal V2 (1050p signal) from a central predictive tap $SD_0$ of the image signal V1 (525p signal). It is noted that positions of $HD_1$ to $HD_4$ are shifted from $SD_0$ position by $k_1$ to $k_4$ horizontally and $m_1$ to $m_4$ vertically, respectively.

Therefore, the items of coefficient data Wi corresponding to the above-described various kinds are each further comprised of items of coefficient data Wi corresponding to the output pixels ($HD_1$ to $HD_4$), respectively. After all, the coefficient memory 136 stores the coefficient data Wi for each combination of the classes, the (six kinds of) parameters r and z, and the output pixels ($HD_1$ to $HD_4$). How to generate this coefficient data Wi will be described later.

This coefficient memory 136 is supplied with, as read address information, a class code CL obtained by the above-described class synthesis circuit 135. This coefficient memory 136 is further supplied with, as the read address information, parameters r and z (rs, zs) indicative of a resolution and a noise cancellation degree, which are contained in the command CMDa also, from the control portion 140. From this coefficient memory 136, items of the coefficient data Wi that corresponds to a class indicated by the class code CL and the kinds of parameters r and z (rs, zs) are read and supplied to the estimation/prediction-computing circuit 137.

The main processing portion 130 further comprises the estimation/prediction-computing circuit 137. This estimation/prediction-computing circuit 137 obtains pixel data y of the target position in the image signal V2 (1050p signal) based on the estimation equation (4) by using multiple items of pixel data xi given as data of a predictive tap selectively taken out by the first tap selection circuit 132$_{-1}$ and items of the coefficient data Wi read out of the coefficient memory 136.

$$y = \sum_{i=1}^{n} W_i \cdot x_i \qquad (4)$$

As described above, to convert a 525p signal into a 1050p signal, it is necessary to obtain four pixels ($HD_1$ to $HD_4$) of the 1050p signal for each pixel ($SD_0$) of the 525p signal (see FIG. 8). This estimation/prediction-computing circuit 137 obtain pixel data for each 2×2 unit pixels block that constitutes the image signal V2 (1050p signal). That is, this estimation/prediction-computing circuit 137 is supplied with, as data of a predictive tap, multiple items of pixel data xi that correspond to four pixels (target pixels) in a unit pixel block from the first tap selection circuit 132$_{-1}$ and also with the items of coefficient data Wi of four pixels that constitute this unit pixel block from the coefficient memory 136. With this, this estimation/prediction-computing circuit 137 individually computes items of data $y_1$ to $y_4$ of the four pixels that constitute the unit pixel block by using the above-described Equation (4).

The main processing portion 130 further comprises a post-processing circuit 138 for linear-sequencing the items of data $y_1$ to $y_4$ of the four pixels in the unit pixel block sequentially output from the estimation/prediction-computing circuit 137 and outputting them in a format of the 1050p signal.

The following will describe operations of the image-processing portion 122 shown in FIG. 6. The image signal V1 (525p signal) is temporarily stored in the buffer memory 131. Based on the image signal V1 temporarily stored in the buffer memory 131, the second tap selection circuit 132$_2$ selectively takes out, as data of a space class tap, multiple items of pixel data positioned in a periphery of the target position in the image signal V2 (1050p signal), that is, in a periphery of the four pixels in the unit pixel block of the target position. The multiple items of pixel data are supplied to the space class detection circuit 133. At the space class detection circuit 133, ADRC processing is performed on each of the multiple items of pixel data given as the data of the space class tap, to obtain re-quantization code qi as class information of the space class (class classification mainly for representation of a waveform in a space) (see Equation (1)).

Further, based on the image signal V1 temporarily stored in the buffer memory 131, the third tap selection circuit 132$_{-3}$ selectively takes out, as data of a motion class tap, multiple items of pixel data positioned in a periphery of the target position in the image signal V2 (1050p signal), that is, in a periphery of the four pixels in the unit pixel block of the target position. The multiple items of pixel data are supplied to the motion class detection circuit 134. At the motion class detection circuit 134, class information MV of a motion class (class classification mainly for representing a degree of motion) is obtained from the multiple items of pixel data given as motion class tap data.

This motion information MV and the above-described re-quantization code qi are supplied to the class synthesis circuit 135. At this class synthesis circuit 135, from these motion information MV and re-quantization code qi, for each of the unit pixel blocks that constitute the image signal V2 (1050p signal), a class code CL indicative of a class to which four pixels (target pixels) in that unit pixel block belong is obtained (see Equation (3)). This class code CL is supplied to the coefficient memory 136 as read address information. This coefficient memory 136 is also supplied with, as read address information, parameters r and z (rs and zs) included in the command CMDa and indicative of a resolution and a noise cancellation degree from the control portion 140.

The first tap selection circuit 132$_{-1}$ selectively takes out, as data of a predictive tap, multiple items of pixel data xi positioned in a periphery of the target position in the image signal V2 (1050p signal), that is, in a periphery of four pixels in a unit pixel block of that target position, based on the image signal V1 temporarily stored in the buffer memory 131. The multiple items of pixel data xi are supplied to the estimation/prediction-computing circuit 137.

From the coefficient memory 136, items of the coefficient data Wi of four pixels that constitute a unit pixel block of the target position in the above-described image signal V2 that correspond to a class indicated by a class code CL and the kinds of parameters r and z (rs and zs) are read and supplied to the estimation/prediction-computing circuit 137. At the estimation/prediction-computing circuit 137, multiple items of pixel data xi given as predictive tap data and coefficient data Wi of four pixels are used to individually obtain items of data $y_1$ to $y_4$ of the four pixels that constitute a unit pixel block of the target position, by using the estimate equation (4).

As target positions in the image signal V2 (1050p signal) change sequentially, items of pixel data $y_1$ to $y_4$ of a unit block of each of the target positions in the image signal V2 are output sequentially from the estimation/prediction-computing circuit 137. At the post-processing circuit 138, the items of pixel data $y_1$ to $y_4$ of the unit block of each of the target positions sequentially output from the estimation/prediction-computing circuit 137 are linear-sequenced and output in the format of the 1050p signal. That is, the image signal V2, which is a 1050p signal, is output from this post-processing circuit 138.

As described above, to adjust a resolution and a noise cancellation degree, six kinds of parameters r and z indicative of the resolution and the noise cancellation degree and included in a frame-specific control command for controlling processing to be performed by this DRC portion 109 are repeated sequentially. Therefore, when these resolution and noise cancellation degree are adjusted, the resolution and the noise cancellation degree due to the outgoing image signal V2 (1050p signal) repeatedly change sequentially to such resolution and noise cancellation degree as to correspond to the six kinds of parameters r and z, for each frame.

In a normal operation after the user has selected his desired resolution and noise cancellation degree, parameters rs and zs indicative of a resolution and a noise cancellation degree included in a frame-specific control command for controlling processing to be performed by the DRC portion 109 would indicate the user selected resolution and noise cancellation degree, respectively. Therefore, in the normal operation, a resolution and a noise cancellation degree due to the image signal V2 (1050p signal) are those selected by the user at the time of adjustment.

The following will describe operations of the image display device 100 shown in FIG. 1. A 525i signal obtained by the tuner 106 is supplied to the control-command-adding portion 107. For each frame of the 525i signal, this control-command-adding portion 107 adds the control command CMD for controlling processing at each of the IP convert portion 108, the DRC portion 109, and the Picture-in-Picture-screen-processing portion 110, to obtain the control-command-added image signal SVa (see FIGS. 5A to 5D).

This image signal SVa is supplied to the IP convert portion 108. For each frame, the IP convert portion 108 separates from this image signal SVa the control command CMD and the image signal V1 to obtain them. For each frame, this IP convert portion 108 further converts the 525i-type image signal V1 into a 525p-type signal based on such a control command CMDa (command 1) of the control commands CMD as to control processing to be performed by its own processing portion. For each frame, this IP convert portion 108 further adds to the post-processing image signal V2 the control commands CMD other than the control command CMDa, that is, such control commands CMDb (command 2 and command 3) for controlling processing to be performed by the other processing portions, to obtain the control-command-added image signal SVb to be output.

For each frame, this image signal SVb has the control commands CMD added to it which control processing to be performed by the DRC portion 109 and the Picture-in-Picture-screen-processing portion 110, respectively. This image signal SVb is supplied to the DRC portion 109. For each frame, at this DRC portion 109, from the control-command-added image signal SVb, the control command CMD and the image signal V1 are separated and obtained. Further, for each frame, at this DRC portion 109, based on the control command CMDa (command 2) included in the control commands CMD and used for controlling processing to be performed by its own processing portion, such processing is performed as to convert the image signal V1, which is a 525p signal, into the image signal V2, which is a 1050p signal. Further, for each frame, at this DRC portion 109, the control commands CMD other than the control command CMDa, that is, the control command CMDb (command 3) for controlling processing to be performed by the other processing portions is added to the post-processing image signal V2, to obtain the control-command-added image signal SVc to be output.

For each frame, this image signal SVc has the control command CMD added to it which controls processing to be performed by the Picture-in-Picture-screen-processing portion 110. This image signal SVc is supplied to the Picture-in-Picture-screen-processing portion 110. At this Picture-in-Picture-screen-processing portion 110, from the control-command-added image signal SVc, the control command CMD and the image signal V1 are respectively separated and obtained for each frame. Further, for each frame, at this Picture-in-Picture-screen-processing portion 110, based on the control command CMD, that is, based on the control command CMDa (command 3) for controlling processing to be performed by its own processing portion, the image signal SVd for displaying an image on the screen of the display 113 is generated from the image signal V1.

This image signal SVd (1050p signal) is supplied via the synthesizer 115 to the panel driver 112. Based on the image signal SVd, the panel driver 112 drives the display 113. In such a manner, an image due to the image signal SVd is displayed on the screen of the display 113.

The following will describe in detail operations when a resolution and a noise cancellation degree are adjusted. The user can provide time for adjusting a resolution and a noise cancellation degree by operating the remote-control transmitter 103. During a time for adjusting the resolution and the noise cancellation degree, six kinds of parameters r and z included in the frame-specific control command and indicative of processing to be performed by this DRC portion 109 are repeated sequentially. Therefore, during the time for adjusting these resolution and noise cancellation degree, the resolution and the noise cancellation degree of an image due to the post-processing image signal V2 (1050p signal) output from the image processing portion 122 in the DRC portion 109 repeatedly change sequentially to those that correspond to the six kinds of parameters r and z for each frame.

Further, during the time for adjusting these resolution and noise cancellation degree, the frame-specific control command CMD for controlling processing to be performed by the Picture-in-Picture-screen-processing portion 110 includes information indicative of being Picture-in-Picture screen processing and even such information as to indicate a Picture-in-Picture screen position. Such pieces of information of this Picture-in-Picture screen position as to be of six positions that correspond to the above-described six kinds of parameters r and z, respectively, are sequentially repeated for each frame.

Therefore, for each frame, the image-processing portion 122 in the Picture-in-Picture-screen-processing portion 110 writes a portion of a sixth (⅙) region of the image signal V1 (e.g., a left top region when the screen is divided by three horizontally and by two vertically) to such a memory region in the image memory 111 as to correspond to the information on the Picture-in-Picture screen position. Furthermore, for each frame, the image-processing portion 122 in this Picture-in-Picture-screen-processing portion 110 reads one frame of the image signal out of the image memory 111, to obtain the image signal SVd for displaying an image on the screen of the display 113.

Figure 9A:
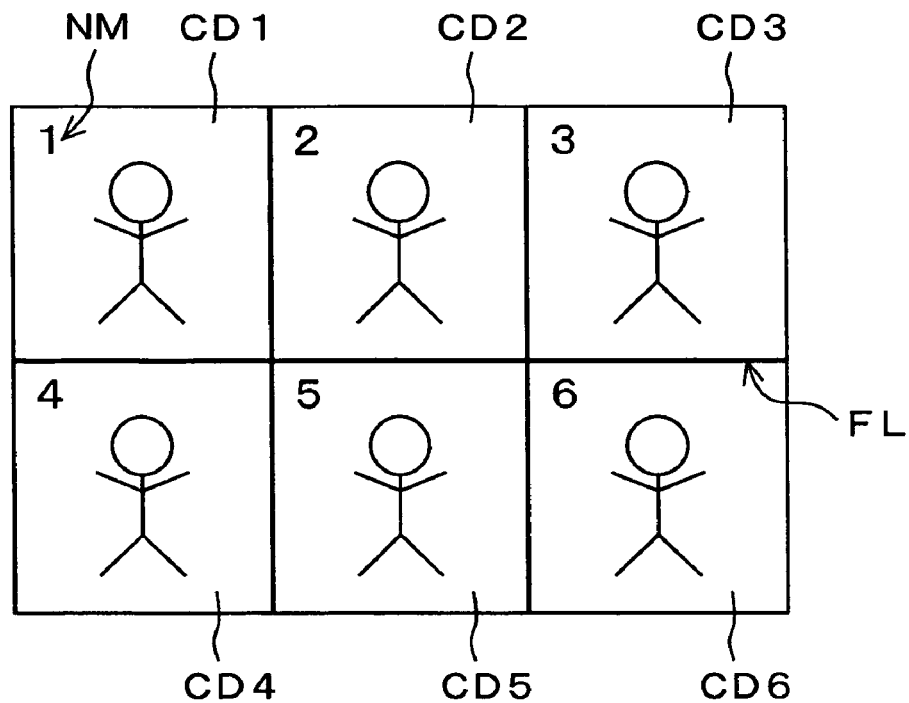
FIG. 9A is an illustration showing images displayed when a resolution and a noise cancellation degree are adjusted.

Therefore, during the time for adjusting these resolution and noise cancellation degree, on the screen of the display 113, Picture-in-Picture screen images CD1 to CD6 with six split-screen of such resolution and noise cancellation degree as to correspond to the six kinds of parameters r and z are displayed alongside as shown in FIG. 9A. Further, during the time for adjustment of these resolution and noise cancellation degree, the OSD portion 114 generates the display signal SCH for displaying a frame enclosing each of the Picture-in-Picture screen images displayed alongside on the screen of the display 113 and numbers for identifying each of these Picture-in-Picture screen images, under the control of the system controller 101. This display signal SCH is synthesized by the synthesizer 115 into the image signal SVd. Thus, on the screen of the display 113, a frame FL that encloses the Picture-in-Picture screen images CD1 to CD6 is displayed along with numbers NM for identifying the Picture-in-Picture screen images CD1 to CD6, respectively.

The user can operate the remote-control transmitter 103 during the time for adjusting these resolution and noise cancellation degree, to select his desired one of the Picture-in-Picture screen images CD1 to CD6 displayed on the screen of the display 113, thereby selecting his desired resolution and noise cancellation degree. In this case, the user can select his desired one of the Picture-in-Picture screen images by using the number NM.

The following will describe in detail operations during an ordinary time after the user has selected his desired resolution and noise cancellation degree. During this ordinary tire, parameters r and z included in a frame-specific control command for controlling processing to be performed by the DRC portion 109 and indicative of a resolution and a noise cancellation degree are supposed to indicate the resolution and noise cancellation degree selected by the user. Therefore, during this ordinary time, a resolution and a noise cancellation degree due to the post-processing image signal V2 (1050p signal) output from the image-processing portion 122 in the DRC portion 109 provide those selected by the user during adjustment.

Figure 9B:
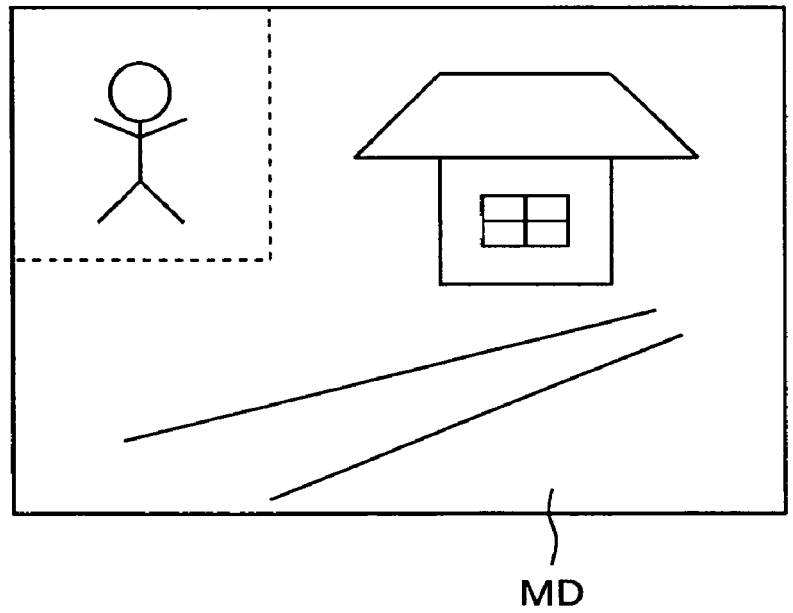
FIG. 9B is an illustration showing an image displayed at normal resolution and noise cancellation degree.

Further, during this ordinary time, information indicative of being ordinary processing is included in a control command CMD for controlling processing to be performed by this Picture-in-Picture-screen-processing portion 110. Therefore, the image-processing portion 122 in the Picture-in-Picture-screen-processing portion 110 writes the separated and obtained image signal V1 into the image memory 111 for each frame. Furthermore, the image-processing portion 122 in the Picture-in-Picture-screen-processing portion 110 reads one frame of the image signal out of the image memory 111 for each frame, to obtain the image signal SVd for displaying an image on the screen of the display 113. Thus, an ordinary image MD having user-selected resolution and noise cancellation degree is displayed on the screen of the display 113 as shown in FIG. 9B.

In such a manner, in the image display device 100 shown in FIG. 1, for each frame of the image signal (525i signal), the control-command-adding portion 107 adds the control command CMD for controlling processing to be performed by each of the IP convert portion 108, the DRC portion 109, and the Picture-in-Picture-screen-processing portion 110, to generate the control-command-added image signal SVa, so that the IP convert portion 108, the DRC portion 109, and the Picture-in-Picture-screen-processing portion 110 each process the image signal based on such a control command CMDa of these control commands CMD as to control processing to be performed by its own processing portion, the DRC portion 109 and the Picture-in-Picture-screen-processing portion 110 of which can easily change processing for each frame during adjustment of the resolution and the noise cancellation degree without regarding a timing for supplying the control command to them.

The following will describe how to generate items of coefficient data Wi (i=1 to n) to be stored in the coefficient memory 136 (see FIG. 6) of the image-processing portion 122 in the DRC portion 109. This coefficient data Wi is generated by learning.

First, how to learn will be described. In the above Equation (4), before learning, items of coefficient data $W_1, W_2, \ldots, W_n$ are undetermined coefficients. Learning involves using multiple items of learning data for each class. When the number of items of learning data is m, the following equation (5) is established according to Equation (4). In it, n indicates the number of predictive taps.

$$y_k = W_1 \times x_{k1} + W_2 \times x_{k2} + \ldots + W_n \times x_{kn} \tag{5}$$

$$(k=1, 2, \ldots, m)$$

If m>n, then the items of coefficient data $W_1, W_2, \ldots, W_n$ are not determined uniquely, so that an element $e_k$ of an error vector e is defined by the following Equation (6), to obtain coefficient data that minimizes $e^2$ in Equation (7). The coefficient data is defined uniquely through so-called the least square method.

$$e_k = y_k - \{W_1 \times x_{k1} + W_2 \times x_{k2} + \ldots + W_n \times x_{kn}\} \tag{6}$$

$$(k=1, 2, \ldots, m)$$

$$e^2 = \sum_{k=1}^{m} e_k^2 \tag{7}$$

To actually calculate the coefficient data that minimizes $e^2$ in Equation (7), first, as shown in Equation (8), partially differentiate $e^2$ with respect to coefficient data Wi (i=1 to n), to obtain such coefficient data Wi that a partial differential of each value of i may be 0.

$$\frac{\partial e^2}{\partial Wi} = \sum_{k=1}^{m} 2\left(\frac{\partial e_k}{\partial Wi}\right) e_k = \sum_{k=1}^{m} 2 x_{ki} \cdot e_k \tag{8}$$

If $X_{ji}$ and $Y_i$ are defined as indicated in Equations (9) and (10), Equation (8) can be written in a matrix of Equation (11).

$$x_{ji} = \sum_{p=1}^{m} x_{pi} \cdot x_{pj} \tag{9}$$

$$Y_i = \sum_{k=1}^{m} x_{ki} \cdot y_k \tag{10}$$

$$\begin{bmatrix} X_{11} & X_{12} & \cdots & X_{1n} \\ X_{21} & X_{22} & \cdots & X_{2n} \\ \cdots & \cdots & \cdots & \cdots \\ X_{n1} & X_{n2} & \cdots & X_{nn} \end{bmatrix} \begin{bmatrix} W_1 \\ W_2 \\ \cdots \\ W_n \end{bmatrix} = \begin{bmatrix} Y_1 \\ Y_2 \\ \cdots \\ Y_n \end{bmatrix} \tag{11}$$

This equation (11) is a normal equation for calculating coefficient data. By solving this normal equation by using a general solution such as sweeping (Gauss-Jordan elimination), coefficient data Wi (i=1 to n) can be obtained.

The following will describe a coefficient data generator 150 for generating coefficient data Wi, with reference to FIG. 10. This coefficient data generator 150 comprises an input terminal 151 to which a 1050p signal as a teacher signal (high quality data) is input and a student signal generation circuit 152 for thinning this 1050p signal horizontally and vertically to obtain a 525p signal as a student signal. This student signal generation circuit 152 is supplied with six kinds of parameters r and z. These six kinds of parameters r and z correspond to six kinds of parameters r and z supplied during adjustment of a resolution and a noise cancellation degree from the control portion 140 to the coefficient memory 136 that constitutes the main processing portion 130 (see FIG. 6) in the above-described DRC portion 109.

The student signal generation circuit 152 varies a frequency characteristic of a thinning filter used when generating a 525p signal from a 1050p signal in response to a value of parameter r. Further, in response to a value of parameter z, a quantity of noise applied to the 525p signal is varied.

By varying the frequency characteristic of the thinning filter used when generating a 525p signal from a 1050p signal, a 525p signal with a different resolution can be generated. By conducting learning by using the 525p signal with a different resolution, it is possible to generate coefficient data Wi with a different effect of improving a resolution. For example, in a case where there are a 525p signal that provides an image having a large degree of blurring and another 525p signal that provides an image having a small degree of blurring, learning by use of the 525p signal that provides the image with large blurring can generate coefficient data Wi having a higher effect of improving a resolution and the 525p signal that provides the image with small blurring can generate coefficient data Wi having a lower effect of improving the resolution.

Further, by adding noise to the 525p signal, a noise-added 525p signal can be generated. By changing a quantity of noise to be added, it is possible to generate 525p signals with varying quantities of noise, thereby giving items of coefficient data Wi having different effects of canceling noise. For example, if there are a 525p signal having much noise added to it and another 525p signal having less noise added to it, learning by use of the 525p signal having much noise added to it can generate coefficient data Wi having a higher noise cancellation effect and learning by use of the 525p signal having less noise added to it can generate coefficient data Wi having a lower noise cancellation effect.

Further, the coefficient data generator 150 comprises first through third tap selection circuits 153 to 155, each of which selectively takes out and output multiple items of pixel data positioned in a periphery of a target position in a 1050p signal, based on a 525p signal output from the student signal generation circuit 152. These first through third tap selection circuits 153 to 155 are configured much the same way as the first through third tap selection circuits $132_{-1}$ through $133_{-3}$ that constitute the main processing portion 130 (see FIG. 6) in the above-described DRC portion 109.

The coefficient data generator 150 further comprises a space class detection circuit 157. This space class detection circuit 157 detects a level distribution pattern of multiple items of pixel data as data of a space class tap that is selectively taken out by the second tap selection circuit 154 and, based on this level distribution pattern, detects a space class and then outputs information of this class. This space class detection circuit 157 is similarly configured much the sane way as the space class detection circuit 133 that constitutes the main processing portion 130 in the above-described DRC portion 109. From this space class detection circuit 157, a re-quantization code qi that corresponds to each of the multiple items of pixel data is output as class information indicative of the space class.

The coefficient data generator 150 further comprises a motion class detection circuit 158. This motion class detection circuit 158 detects a motion class for indicating mainly a degree of motion from multiple items of pixel data as data of a motion class tap that is selectively taken out by the third tap selection circuit 155 and outputs class information MV of that motion class. This motion class detection circuit 158 is configured much the same way as the motion class detection circuit 134 that constitutes the main processing portion 130 in the above-described DRC portion 109. At this motion class detection circuit 158, an inter-frame difference is calculated from multiple items of pixel data selectively taken out by the third tap selection circuit 155, and threshold value processing is performed on an average value of absolute values of these differences to detect a motion class, which is an index of the motion.

The coefficient data generator 150 further comprises a class synthesis circuit 159. This class synthesis circuit 159 generates a class code CL indicative of a class to which pixel data of a target position in a 1050p signal belongs, based on a re-quantization code qi given as class information of a space class output from the space class detection circuit 157 and class information MV of a motion class output from the motion class detection circuit 158. This class synthesis circuit 159 also is configured much the same way as the class synthesis circuit 135 that constitutes the main processing portion 130 in the above-described DRC portion 109.

The coefficient data generator 150 further comprises a normal equation generation portion 160. This normal equation generation portion 160 generates, for each class, a normal equation (see Equation (11)) for obtaining items of coefficient data Wi (i=1 to n) from pixel data y of each target position obtained from a 1050p signal given as a teacher signal, multiple items of pixel data xi taken out as predictive tap data selectively by the first tap selection circuit 153 corresponding respectively to these items of pixel data y of the target positions, and a class code CL obtained by the class synthesis circuit 159 corresponding respectively to the items of pixel data y of the target positions.

In this case, for each combination of one item of pixel data y and the corresponding multiple items of pixel data xi, one item of learning data is generated. For each class, a lot of items of learning data are generated between a 1050p signal as a teacher signal and a 525p signal as a student signal. Accordingly, for each class, a normal equation for obtaining coefficient data Wi is generated by the normal equation generation portion 160.

In this case also, parameters r and z to be supplied to the student signal generation circuit 152 are sequentially changed into those of six kinds as described above, so that by using 525p signals generated on the basis of the respective parameters r and z, normal equations for obtaining coefficient data Wi for the respective classes are generated corresponding to these six kinds of parameters r and z.

In this case also, the normal equation generation portion 160 generates a normal equation for each of the output pixels ($HD_1$ to $HD_4$ of FIG. 8). That is, normal equations corresponding to $HD_1$ to $HD_4$ respectively are generated by using learning data comprised of items of pixel data y whose values of a shift from a central predictive tap are in the same relationships as those of $HD_1$ to $HD_4$.

After all, the normal equation generation portion 160 generates a normal equation for each combination of a class, each of the kinds (six kinds) of parameters r and z, and each of the output pixels $HD_1$ to $HD_4$.

The coefficient data generator 150 further comprises a coefficient data decision portion 161 and a coefficient memory 162. The coefficient data decision portion 161 is supplied with data for a normal equation from the normal equation generation portion 160 and solves this normal equation by sweeping etc., to obtain coefficient data Wi for each combination of a class, each of the kinds (six kinds) of parameter r and z, and each of the output pixels ($HD_1$ to $HD_4$). The coefficient memory 162 stores the coefficient data Wi obtained by the coefficient data decision portion 161.

The following will describe operations of the coefficient data generator 150 shown in FIG. 10. Horizontal and vertical thinning processing is performed by the student signal generation circuit1 152 on a 1050p signal as a teacher signal input to the input terminal 151, to generate a 525p signal as a student signal. In this case, the student signal generation circuit 152 is supplied with six kinds of parameters r and z as a control signal, to sequentially generate six kinds of 525p signals with varied frequency characteristics and quantities of noise being added.

Further, based on the 525p signal (student signal) generated by the student signal generation circuit 152, the second tap selection circuit 154 selectively takes out multiple items of pixel data as data of a space class tap positioned in a periphery of a target position in the 1050p signal (teacher signal). The multiple items of pixel data are supplied to the space class detection circuit 157. This space class detection circuit 157 performs ADRC processing on each of the multiple items of pixel data. A re-quantization code qi as class information of a space class (mainly, class classification for SD representation of a waveform in a space) is obtained (see Equation (1)).

Further, based on the 525p signal (student signal) generated by the student signal generation circuit 152, the third tap selection circuit 155 selectively takes out multiple items of pixel data as data of a motion class tap positioned in a periphery of a target pixel in the 1050p signal (teacher signal). The multiple items of pixel data are supplied to the motion class detection circuit 158. This motion class detection circuit 158 processes the multiple items of pixel data, to obtain class information MV of a motion class (mainly, class classification for representation of a degree of motion).

This class information MV and the above-described re-quantization code qi are supplied to the class synthesis circuit 159. From these class information MV and re-quantization code qi, this class synthesis circuit 159 obtains a class code CL that indicates a class to which pixel data of a target position in the 1050p signal (teacher signal) belongs (see Equation (3)).

Further, based on the 525p signal (student signal) generated by the student signal generation circuit 152, the first tap selection circuit 153 selectively takes out multiple items of pixel data xi as data of a predictive tap positioned in a periphery of a target position in the 1050p signal (teacher signal).

Then, at the normal equation generation portion 160, a normal equation (see Equation (11)) for obtaining items of coefficient data Wi (i=1 to n) is generated for each combination of a class, each of the kinds (six kinds) of parameters r and z, and each of the output pixels ($HD_1$ to $HD_4$), based on pixel data y of each target position obtained from a 1050p signal (teacher signal), multiple items of pixel data xi taken out as predictive tap data selectively by the first tap selection circuit 153 corresponding respectively to the items of pixel data y of the target positions, and a class code CL obtained by the class synthesis circuit 159 corresponding respectively to the items of pixel data y of the target positions.

Data for a normal equation generated by this normal equation generation portion 160 is supplied to the coefficient data decision portion 161. This coefficient data decision portion 161 solves each of these normal equations, to obtain coefficient data Wi for each combination of a class, each of the kinds (six kinds) of parameters r and z, and each of the output pixels ($HD_1$ to $HD_4$). This coefficient data Wi is stored in the coefficient memory 162.

It is thus possible for the coefficient data generator 150 shown in FIG. 10 to generate items of coefficient data Wi (i=1 to n) to be stored in the coefficient memory 136 that constitutes the main processing portion 130 in the above-described DRC portion 109, for each combination of a class, each of the kinds (six kinds) of parameters r and z, and each of the output pixels ($HD_1$ to $HD_4$).

Although in the above embodiment, during the adjustment of a resolution and a noise cancellation degree, the Picture-in-Picture-screen-processing portion 110 has written, for each frame, a sixth (⅙) region of a separated and obtained image signal (e.g., a left top region when the screen is divided by three horizontally and by two vertically) to such a memory region in the image memory 111 as to correspond to the information on Picture-in-Picture screen position, the ⅙ region to be written to the memory region in the screen memory 111 that corresponds to the information on Picture-in-Picture screen position is not limited to the left top region but may be any other region. In this case, an arbitrary ⅙ region may be selected by the user. In this case also, it may be permitted not only to select an arbitrary one of ⅙ regions obtained by dividing the screen by three horizontally and by two vertically but also to move this selected ⅙ region arbitrarily on the screen. It is thus possible for a user to adjust a resolution and a noise cancellation degree of an image of an arbitrary position on the screen so that they may take on desired values.

Although in the above embodiment, six kinds of parameters indicative of a resolution and a noise cancellation degree have been given, the present invention is limited to it.

Figure 11:
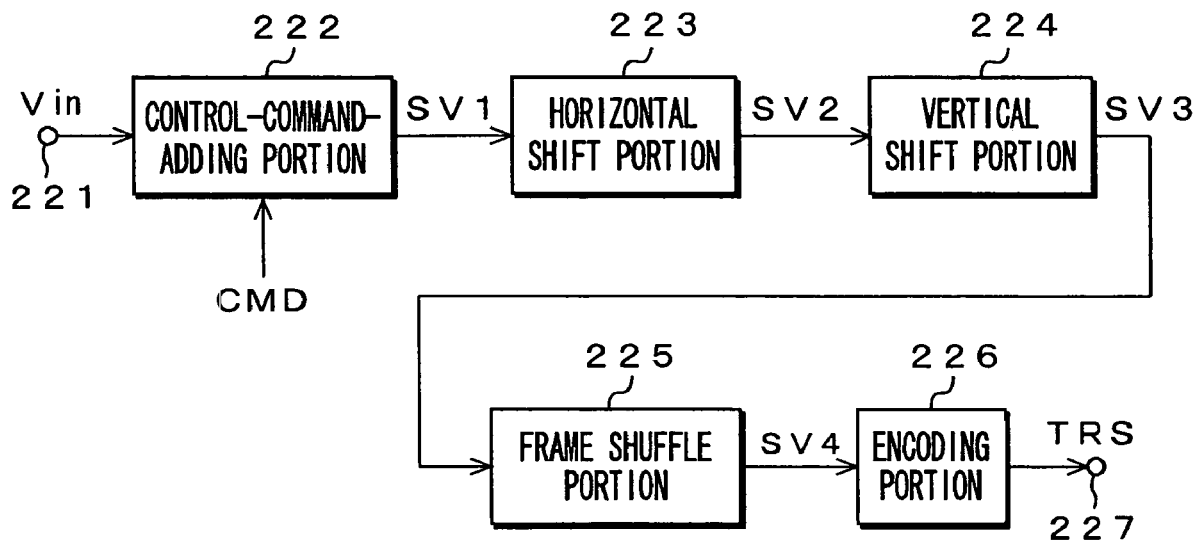
FIG. 11 is a block diagram for showing a configuration of an embodiment of an image-signal-processing device (encode side) according to the invention.
Figure 12:
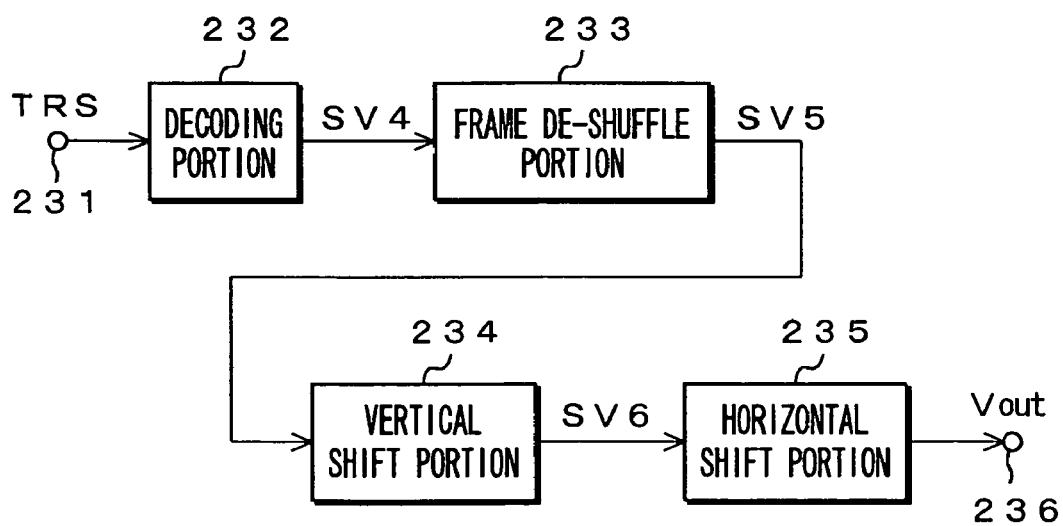
FIG. 12 is a block diagram for showing a configuration of another embodiment of an image-signal-processing device (decode side) according to the invention.

The following will describe another embodiment of the present invention. FIGS. 11 and 12 show a configuration of an image-signal-processing device (encode side) 200E and that of an image-signal-processing device (decode side) 200D, respectively, according to the present embodiment.

The image-signal-processing device 200E has a function to obtain a data stream encrypted by performing intra to line shuffling, line shuffling, and frame shuffling on an input image signal Vin and perform encoding, for example, error correction-encoding, modulation-encoding, etc. on this data stream, thus obtaining a transmission signal. The image-signal-processing device 200D has a function to obtain the encrypted data stream by decoding the transmission signal obtained at this image signal processing device 200E and perform frame de-shuffling, line de-shuffling, and intra-line de-shuffling on this data stream, thus obtaining an output image signal Vout.

First, the image-signal-processing device 200E shown in FIG. 11 will be described. This image-signal-processing device 200E comprises an input terminal 221 to which an input image signal Vin is input and a control-command-adding portion 222. This control-command-adding portion 222, for each frame of the input image signal Vin applied to the input terminal 221, adds a control command CMD for controlling processing to be performed by a horizontal shift portion 223, a vertical shift portion 224, and a frame shuffle portion 225, respectively, which will be described later, to generate a control-command-added image signal SV1.

The image-signal-processing device 200E further comprises the horizontal shift portion 223, the vertical shift portion 224, and the frame shuffle portion 225.

The horizontal shift portion 223 receives the control-command-added image signal SV1 from the control-command-adding portion 222 and, from this control-command-added image signal SV1, separates control commands and image signals to obtain them, for each frame.

Figure 13:
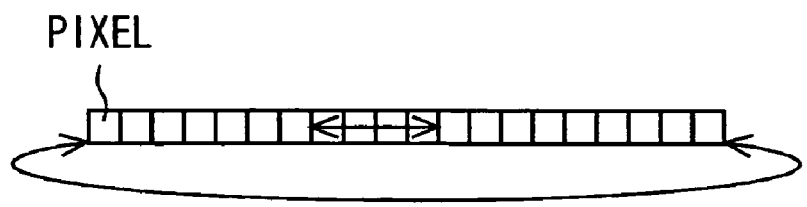
FIG. 13 is an explanatory diagram of a pixel shift in intra-line shuffling.

Further, this horizontal shift portion 223 horizontally shifts pixels of each line, that is, performs intra-line shuffling, based on a control command for controlling processing to be performed by its own processing portion, said control command being included in these separated and obtained control commands, for each frame. In the present embodiment, the horizontal shift portion 223, as shown in FIG. 13, shifts no pixels if it is supplied with code 1 as the control command, shifts the pixels by one pixel to a plus side if it is supplied with code 2 as the control command, and shifts the pixels by one pixel to a minus side if it is supplied with code 3 as the control command.

This horizontal shift portion 223 further adds to the post-processing image signal all of the separated and obtained control commands, that is, the control command for controlling processing to be performed by its own processing portion and the other control commands for controlling processing to be performed by the other processing portions to generate a control-command-added image signal SV2 to be output, for each frame.

The vertical shift portion 224 receives the control-command-added image signal SV2 from the horizontal shift portion 223 and, from this control-command-added image signal SV2, separates control commands and image signals to obtain them, for each frame.

Figure 14:
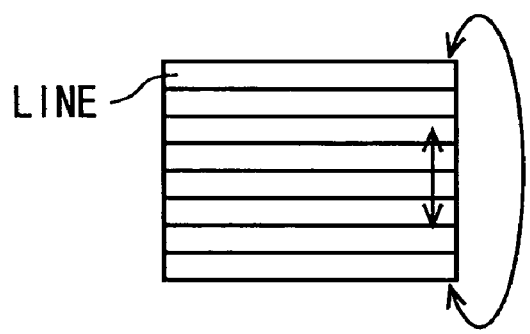
FIG. 14 is an explanatory diagram of a line shift in line shuffling.

Further, this vertical shift portion 224 vertically shifts each line, that is, performs line shuffling, based on a control command for controlling processing to be performed by its own processing portion, said control command being included in these separated and obtained control commands, for each frame. In the present embodiment, the vertical shift portion 224, as shown in FIG. 14, shifts no line if it is supplied with code 1 as the control command, shifts the lines by one line to the plus side if it is supplied with code 2 as the control command, and shifts the lines by one line to the minus side if it is supplied with code 3 as the control command.

This vertical shift portion 224 further adds to the post-processing image signal all of the separated and obtained control commands, that is, the control command for controlling processing to be performed by its own processing portion and the other control commands for controlling processing to be performed by the other processing portions to generate a control-command-added image signal SV3 to be output, for each frame.

The frame shuffle portion 225 receives the control-command-added image signal SV3 from the vertical shift portion 224 and, from this control-command-added image signal SV3, separates control commands and image signals to obtain them for each frame.

Figure 15:
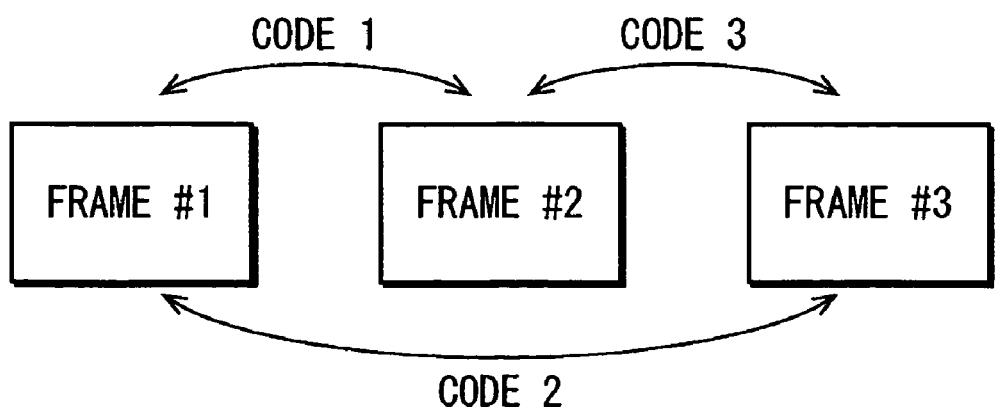
FIG. 15 is an explanatory diagram of image frame position replacement in frame shuffling.

Further, this frame shuffle portion 225, for every three frames, replaces positions of image frames within the three frames, that is, performs frame shuffling, based on a control command for controlling processing to be performed by its own processing portion, said control command being included in these separated and obtained control commands, for each frame. In the present embodiment, the frame shuffle portion 225, as shown in FIG. 15, replaces frame #1 and frame #2 in their positions when supplied with code 1 as the control command, replaces the frame #1 and frame #3 in their positions when supplied with code 2 as the control command, and replaces the frame #2 and the frame #3 in their positions when supplied with code 3 as the control code.

Further, the frame shuffle portion 225 adds to the post-processing image signal (encrypted data stream) all of the separated and obtained control commands, that is, the control command for controlling processing to be performed by its own processing portion and the other control commands for controlling processing to be performed by the other processing portions to generate a control-command-added image signal SV4 to be output, for each frame.

The image-signal-processing device 200E further comprises an encode portion 226 and an output terminal 227. The encode portion 226 performs encoding, for example, error correction-encoding, modulation-encoding, etc. on the control-command-added image signal SV4 output from the frame shuffle portion 225, to generate a transmission signal TRS and output this transmission signal TRS to the output terminal 227.

The processing portion providing a basis for the above-described horizontal shift portion 223, the vertical shift portion 224, and the frame shuffle portion 225 is configured much the same way as the above-described processing portion 120 shown in FIG. 3. However, the control-command-adding portion 124 is supplied with the control command MD itself separated by the separation portion 121 after it is delayed by the delay portion 123. Therefore, for each frame, the control-command-adding portion 124 adds the control command CMD itself separated by the separation portion 121 to one frame of the image signal V2 output from the image-processing portion 122, to obtain the control-command-added image signal SVout to be output.

Further, in the horizontal shift portion 223, the image-processing portion 122 performs intra-line shuffling based on a code indicating the above-described pixel shift quantity, which is the control command CMDa for controlling processing to be performed by its own processing portion. In the vertical shift portion 224, the image-processing portion 122 performs line shuffling based on a code indicating the above-described line shift quantity, which is the control command CMDa for controlling processing to be processed its own processing portion. In the frame shuffle portion 225, the image-processing portion 122 performs frame shuffling based on a code that is frame-position replacement information, which is the control command CMDa for controlling processing to be performed by its own processing portion.

FIG. 16A shows a period of three frames of the input image signal Vin which is input to the input terminal 221. Image frames #1 through #3 each indicate one frame of the image signal. FIG. 16B shows a control-command-added image signal SV1 output from the control-command-adding portion 222. This control-command-added image signal SV1 has, as described above, control commands CMD added to it each of which controls processing to be performed by each of the horizontal shift portion 223, the vertical shift portion 224, and the frame shuffle portion 225, for each frame.

The frame-specific control command CMD is comprised of command 3 for controlling processing to be performed by the horizontal shift portion 223, command 2 for controlling processing to be performed by the vertical shift portion 224, and command 1 for controlling processing to be performed by the frame shuffle portion 225.

Command 3 includes identifier ID3 that identifies being a control command for the horizontal shift portion 223 and a code for indicating a pixel 1 shift quantity. For example, this code comes in code 1, code 2, and code 3 corresponding to image frame #1, image frame #2, and image frame #3, respectively. Command 2 includes identifier ID2 that identifies being a control command for the vertical shift portion 224 and a code for indicating a line shift quantity. For example, this code comes in code 1, code 2, and code 3 corresponding to image frame #1, image frame #2, and image frame #3, respectively.

Command 1 includes identifier ID1 that identifies being a control command for the frame shuffle portion 225 and a code, which is frame position replacement information. For example, this code comes in code 1 in the three-frame period shown in the figure, code 2 in the next three-frame period, code 3 in the further next three-frame period, and so on.

FIG. 16C shows the control-command-added information signal SV4 output from the frame shuffle portion 225. This image signal SV4 has control commands CMD added it each of which controls processing to be performed by each of the horizontal shift portion 223, the vertical shift portion 224, and the frame shuffle portion 225, for each frame of an encrypted data stream. Stream frames #1 through #3 each indicate one frame of the encrypted data stream.

The following will describe operations of the image-signal-processing device 200E shown in FIG. 11. An input image signal Vin applied to the input terminal 221 is supplied to the control-command-adding portion 222. For each frame of the input image signal Vin, this control-command-adding portion 222 adds a control command CMD for controlling processing to be processed by each of the horizontal shift portion 223, the vertical shift portion 224, and the frame shuffle portion 225, to obtain the control-command-added image signal SV1 (see FIG. 16B).

This image signal SV1 is supplied to the horizontal shift portion 223. For each frame, the horizontal shift portion 223 separates the control command CMD and the image signal V1 from this image signal SV1 to obtain them. For each frame, further, this horizontal shift portion 223 shifts pixels of each line, that is, performs intra-line shuffling with respect to the image signal V1, based on such a command CMDa (command 1) of these control commands CMD as to control processing to be performed by its own processing portion. Further, for each frame, this horizontal shift portion 223 adds all of the separated and obtained control commands CMD (commands 1, 2, and 3) to the post-processing image signal V2, to obtain the control-command-added image signal SV2 to be output.

This image signal SV2 is supplied to the vertical shift portion 224. For each frame, this vertical shift portion 224 separates the control command CMD and the image signal V1 from this image signal SV2 to obtain them. For each frame, further, this vertical shift portion 224 shifts each line, that is, performs line shuffling with respect to the image signal SV1, based on such a control command CMDa (command 2) of these control commands CMD as to control processing to be performed by its own processing portion. Further, for each frame, this vertical shift portion 224 adds all the control command CMD to the post-processing image signal V2, to obtain the control-command-added image signal SV3 to be output.

This image signal SV3 is supplied to the frame shuffle portion 225. For each frame, this frame shuffle portion 225 separates the control command CMD and the image signal V1 from this image signal SV3 to obtain them. For every three frames, further, this frame shuffle portion 225 replaces positions of image frames in the three frames, that is, performs frame shuffling, based on such a control command CMDa (command 3) of these control commands CMD as to control processing to be performed by its own processing portion. Further, for each frame, this frame shuffle portion 225 adds all of the control commands CMD to the post-processing image signal V2, to obtain the control-command-added image signal SV4 to be output (see FIG. 16C).

This image signal SV4 is supplied to the encode portion 226. This encode portion 226 performs encoding, for example, error correction-encoding, modulation-encoding, etc. on this image signal SV4, thus obtaining the transmission signal TRS. This transmission signal TRS is output to the output terminal 227.

Next, the image-signal-processing device 200D shown in FIG. 12 will be described. This image-signal-processing device 200D comprises an input terminal 231 to which the transmission signal TRS is input and a decode portion 232. The decode portion 232 decodes the transmission signal TRS input to the input terminal 231, to obtain the control-command-added image signal SV4 (see FIG. 16C).

The image-signal-processing device 200D further comprises a frame de-shuffle portion 233, a vertical shift portion 234, a horizontal shift portion 235, and an output terminal 236.

The frame de-shuffle portion 233 receives the control-command-added image signal SV4 from the decode portion 232 and, from this control-command-added image signal SV4, separates a control command and an image signal to obtain them, for each frame. Further, for every three frames, this frame de-shuffle portion 233 turns back image frames to their original positions within the three frames, that is, performs frame de-shuffling, based on such a control command (command 1) of these separated and obtained control commands as to control processing to be performed by its own processing portion. Further, for each frame, this frame de-shuffle portion 233 adds to the post-processing image signal all of the separated and obtained control commands (commands 2 and 3) except that for controlling processing to be performed by its own processing portion, to obtain a control-command-added image signal SV5 to be output.

The vertical shift portion 234 receives the control-command-added image signal SV5 from the frame de-shuffle portion 233 and, from this control-command-added image signal SV5, separates a control command and an image signal to obtain them, for each frame. Further, this vertical shift portion 234 turns back each line to its original position, that is, performs line de-shuffling, based on such a control command (command 2) of these separated and obtained control commands as to control processing to be performed by its own processing portion. This vertical shift portion 234 further adds to the post-processing image signal all of the separated and obtained commands (command 3) except that for controlling processing to be performed by its own processing portion to generate a control-command-added image signal SV6 to be output, for each frame.

The horizontal shift portion 235 receives the control-command-added image signal SV6 from the vertical shift portion 234 and, from this control-command-added image signal SV6, separates a control command and an image signal to obtain them for each frame. Further, this horizontal shit portion 235, for each frame, turns back pixels of each line to their original positions, that is, performs intra-line de-shuffling, based on such a control command (command 3) of the separated and obtained control commands as to control processing to be performed by its own processing portion, to generate an output image signal Vout that corresponds to the above-described input image signal Vin and output it to the output terminal 236.

The processing portion providing a basis for the above-described frame de-shuffle portion 233, vertical shift portion 234, and horizontal shift portion 235 is configured much the same way as the above-described processing portion 120 shown in FIG. 3. The processing portions are described below individually.

In the frame de-shuffle portion 233, the image-processing portion 122 performs frame de-shuffling based on the above-described code of frame-position replacement information, which is the control command CMDa (command 1) for controlling processing to be performed by its own processing portion. In the frame de-shuffle portion 233, the control-command-added image signal SVin supplied to the control command/image signal separation portion 121 is the image signal SV4 output from the decode portion 232, whose frame-specific control command CMD is comprised of command 1, command 2, and command 3 (see FIG. 16C).

In this case, the control command CMDa for controlling processing to be performed by its own processing portion is command 1 and the control commands CMDb for controlling processing to be performed by the other processing portions are commands 2 and 3. For each frame, the control-command-adding portion 124 adds, as the control command CMD, commands 2 and 3 separated by the separation portion 121 to one frame of the image signal V2 output from the image-processing portion 122, to form a control-command-added image signal SVout to be output.

In the vertical shift portion 234, the image-processing portion 122 performs line de-shuffling based on the above-described code indicating line shift quantity, which is the control command CMDa (command 2) for controlling processing to be performed by its own processing portion. Further, in this vertical shift portion 234, the control-command-added image signal SVin supplied to the control command/image signal separation portion 121 is the image signal SV5 output from the frame de-shuffle portion 233, whose frame-specific control command CMD is comprised of command 2 and command 3.

In this case, the control command M for controlling processing to be performed by its own processing portion is command 2 and the control command CMDb for controlling processing to be performed by the other processing portions is command 3. For each frame, the control-command-adding portion 124 adds, as the control command CMD, command 3 separated by the separation portion 121 to one frame of the image signal V2 output from the image-processing portion 122, to form the control-command-added image signal SVout to be output.

In the horizontal shift portion 235, the image-processing portion 122 performs intra-line de-shuffling based on the above-described code indicating pixel shift quantity, which is the control command C (command 3) for controlling processing to be performed by its own processing portion. Further, in this horizontal shift portion 235, the control-command-added image signal SVin supplied to the control command/image signal separation portion 121 is the image signal SV6 output from the vertical shift portion 234, whose frame-specific control command CMD is comprised of command 3 only. In this case, the control command CMDa for controlling processing to be performed by its own processing portion is command 3 and there is no control command CMDb for controlling processing to be performed by the other processing portions. This horizontal shift portion 235 is not provided with the delay portion 123 and the control-command-adding portion 124 and directly provides the image signal V2 output from the image-processing portion 122, as the image signal Svout.

The following will describe operations of the image-signal-processing device 200D shown in FIG. 12. A transmission signal TRS applied to the input terminal 231 is supplied to the decode portion 232. This decode portion 232 decodes the transmission signal TRS, to obtain the control-command-added image signal SV4 (see FIG. 16C).

This image signal SV4 is supplied to the frame de-shuffle portion 233. For each frame, this frame de-shuffle portion 233 separates the control command CMD and the image signal V1 from this image signal SV4 to obtain them. For every three frames, this frame de-shuffle portion 233 turns back image frames to their original positions within three frames, that is, performs frame de-shuffling based on such a control command (command 1) of the separated and obtained control commands as to control processing to be performed by its own processing portion. Further, for each frame, this frame de-shuffle portion 233 adds to the post-processing image signal V2 all of the control commands CMD except the control command CMDa, that is, the control commands CMDb (commands 2 and 3) for controlling processing to be performed by the other processing portions, to obtain the control-command-added image signal SV5 to be output.

This image signal SV5 is supplied to the vertical shift portion 234. For each frame, this vertical shift portion 234 separates the control command CMD and the image signal V1 from this image signal SV5 to obtain them. For each frame, this vertical shift portion 234 further turns back each line to its original position, that is, performs line de-shuffling based on such a control command CMDa (command 2) of these separated and obtained control commands as to control processing to be performed by its own processing portion. Further, for each frame, this vertical shift portion 234 adds to the post-processing image signal V2 all the control commands CMD except the control command CMDa, that is, the control command CMDb (command 3) for controlling processing to be performed by the other processing portions, to obtain the control-command-added image signal SV6 to be output.

This image signal SV6 is supplied to the horizontal shift portion 235. For each frame, this horizontal shift portion 235 separates the control command CMD and the image signal V1 from this image signal SV6 to obtain them. For each frame, this horizontal shift portion 235 further turns back pixels of each line to their original positions, that is, intra-line de-shuffling based on such a control command CMDa (command 3) of the separated and obtained control commands as to control processing to be performed by its own processing portion, to generate an output image signal Vout that corresponds to the above-described input image signal Vin. This output image signal Vout is output to the output terminal 236.

In such a manner, in the image-signal-processing device 200E shown in FIG. 11, for each frame of the input image signal Vin, the control-command-adding portion 222 adds the control command CMD for controlling processing to be performed by each of the horizontal shift portion 223, the vertical shift portion 224, and the frame shuffle portion 225, to generate the control-command-added image signal SV1, so that the horizontal shift portion 223, the vertical shift portion 224, and the frame shuffle portion 225 respectively process the image signal based on such a control command CMDa of these control commands CMD as to control processing to be performed by its own processing portion. In these processing portions, it is possible to easily change processing for each frame or for every three frames without regarding a timing for supplying the control command to them.

Further, in the image-signal-processing device 200D shown in FIG. 12, for each frame, the image signal SV4 output from the decode portion 232 has a control command CMD added to it which controls processing to be performed by each of the frame de-shuffle portion 233, the vertical shift portion 234, and the horizontal shift portion 235, so that the frame de-shuffle portion 233, the vertical shift portion 234, and the horizontal shift portion 235 respectively process the image signal based on such a control command of the control commands CMD as to control processing to be performed by its own processing portion. In these processing portions, it is also possible to easily change processing for each frame or for every three frames without regarding a timing for supplying the control command to them.

Figure 17:
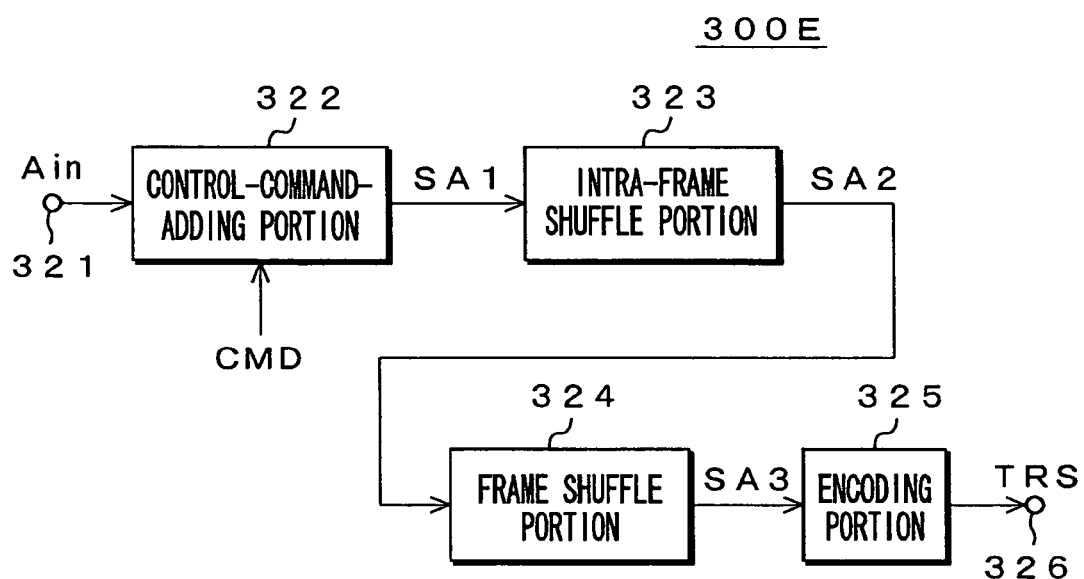
FIG. 17 is a block diagram for showing a configuration of an embodiment of an audio-signal-processing device (encode side) according to the invention.
Figure 18:
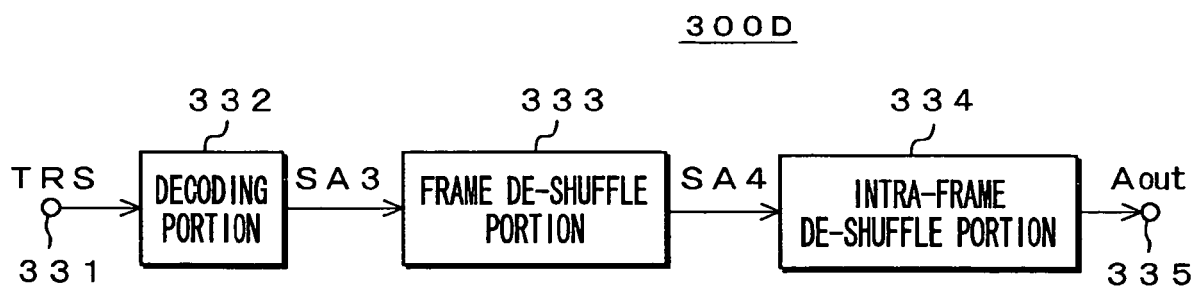
FIG. 18 is a block diagram for showing a configuration of another embodiment of an audio-signal-processing device (decode side) according to the invention.

The following will describe a further embodiment of the present invention. In contract to the above embodiments for handling an image signal, the present embodiment handles an audio signal. FIGS. 17 and 18 respectively show a configuration of an audio-signal-processing device (encode side) 300E and that of an audio-signal-processing device (decode side) 300D according to the present embodiment.

The audio-signal-processing device 300E has a function to obtain a data stream encrypted by performing intra-frame shuffling and frame shuffling on an input audio signal Ain and perform encoding, for example, error correction-encoding, modulation-encoding, etc. on this data stream, thus obtaining a transmission signal. The audio-signal-processing device 300D has a function to obtain the encrypted data stream by decoding the transmission signal obtained at this audio-signal-processing device 300E and perform frame de-shuffling and intra-frame de-shuffling on this data stream, thus obtaining an output audio signal Aout.

It is to be noted that an audio frame is constituted of sample data having a predetermined lapse of time. Intra-frame shuffling is processing to shift a position of the sample data within the audio frame. Further, frame shuffling is processing to, for each predetermined number of audio frames, replace positions of the audio frames within that predetermined number of audio frames.

First, the audio-signal-processing device 300E shown in FIG. 17 will be described. This audio-signal-processing device 300E comprises an input terminal 321 to which an input audio signal Ain is input and a control-command-adding portion 322. This control-command-adding portion 322, for each audio frame of the input audio signal Ain applied to the input terminal 321, adds a control command CMD for controlling processing to be performed by respective intra-frame shuffle portion 323 and frame shuffle portion 324, to generate a control-command-added audio signal SA1. This control-command-adding portion 322 corresponds to the control-command-adding portion 222 in the above-described image-signal-processing device 200E shown in FIG. 11.

The audio-signal-processing device 300E further comprises the intra-frame shuffle portion 323 and the frame shuffle portion 324. The intra-frame shuffle portion 323 receives the control-command-added audio signal SA1 from the control-command-adding portion 322 and, from this audio signal SA1, separates a control command and an audio signal to obtain them, for each audio frame. This intra-frame shuffle portion 323 further shifts positions of sample data in an audio frame, that is, performs intra-frame shuffling based on a control command for controlling processing to be performed by its own processing portion, said control command being included in these separated and obtained control commands, for each audio frame. This intra-frame shuffle portion 323 adds to the post-processing audio signal all of the separated and obtained control commands, that is, the control command for controlling processing to be performed by its own processing portion and the other control commands for controlling processing to be performed by the other processing portions to generate a control-command-added audio signal SA2 to be output, for each audio frame.

The frame shuffle portion 324 receives the control-command-added audio signal SA2 from the intra-frame shuffle portion 323 and, from this control-command-added audio signal SA2, separates a control command and an audio signal to obtain them, for each audio frame. This frame shuffle portion 324 further, for each predetermined number of audio frames, replaces positions of the audio frames within this predetermined number of audio frames, that is, performs frame shuffling. The frame shuffle portion 324 further adds to the post-processing audio signal all of the separated and obtained control commands, that is, the control command for controlling processing to, be performed by its own processing portion and the other control commands for controlling processing to be performed by the other processing portions to generate a control-command-added audio signal SA3 to be output, for each audio frame.

The audio-signal-processing device 300E further comprises an encode portion 325 and an output terminal 326. The encode portion 325 performs encoding, for example, error correction-encoding, modulation-encoding, etc. on the control-command-added audio signal SA3 output from the frame shuffle portion 324, to generate a transmission signal TRS and output this transmission signal TRS to the output terminal 326.

The processing portion providing a basis for the above-described intra-frame shuffle portion 323 and the frame shuffle portion 324 is configured much the same way as the above-described processing portion 120 shown in FIG. 3. However, the control-command-adding portion 124 is supplied with the control command CMD itself separated by the separation portion 121 after it is delayed by the delay portion 123. Therefore, for each audio frame, the control-command-adding portion 124 adds the control command CMD itself separated by the separation portion 121 to one audio frame of the audio signal A2 (which corresponds to the image signal V2 of FIG. 3) output from the audio-processing portion (which corresponds to the image-processing portion 122 of FIG. 3), to obtain the control-command-added audio signal SAout (which corresponds to the image signal SVout of FIG. 3) to be output.

Further, in the intra-frame shuffle portion 323, the audio-processing portion performs intra-frame shuffling on the audio signal A1 (which corresponds to the image signal V1 of FIG. 3) based on the control command CMDa for controlling processing to be performed by its own processing portion. In the frame shuffle portion 324, the audio-processing portion performs frame shuffling on the audio signal A1 based on the control signal CMDa for controlling processing to be performed by its own processing portion.

The following will describe operations of the audio-signal-processing device 300E shown in FIG. 17. An input audio signal Ain applied to the input terminal 321 is supplied to the control-command-adding portion 322. For each audio frame of the input audio signal Ain, this control-command-adding portion 322 adds a control command CMD for controlling processing to be processed by each of the intra-frame shuffle portion 323 and the frame shuffle portion 324, to obtain the control-command-added audio signal SA1.

This audio signal SA1 is supplied to the intra-frame shuffle portion 323. For each audio frame, this intra-frame shuffle portion 323 separates the control cons CMD and the audio signals A1 from this audio signal SA1 to obtain them. For each audio frame, this intra-frame shuffle portion 323 further shifts positions of sample data within the audio frame, that is, performs intra-frame shuffling on the audio signals A1 based on such a control command CMDa of these control commands CMD as to control processing to be performed by its own processing portion. Further, for each audio frame, this intra-frame shuffle portion 323 adds all of the separated and obtained control commands CMD to the post-processing audio signal A2, to obtain the control-command-added audio signal SA2 to be output.

This audio signal SA2 is supplied to the frame shuffle portion 324. For each audio frame, this frame shuffle portion 324 separates the control commands CMD and the audio signals A1 from this audio signal SA2 to obtain them. This frame shuffle portion 324 further, for each predetermined number of audio frames, replaces positions of the audio frames within this predetermined number of audio frames, that is, performs frame shuffling. Further, for each audio frame, the frame shuffle portion 324 adds all of the separated and obtained control CMD to the post-processing audio signal A2, to obtain the control-command-added audio signal SA3 to be output.

This audio signal SA3 is supplied to the encode portion 325. This encode portion 325 performs encoding, for example, error correction-encoding, modulation-encoding, etc. on this audio signal SA3, thus obtaining a transmission signal TRS. This transmission signal TRS is output to the output terminal 326.

Next, the audio-signal-processing device 300D shown in FIG. 18 will be described. This audio-signal-processing device 300D comprises an input terminal 331 to which the transmission signal TRS is input and a decoding portion 332. The decoding portion 332 decodes the transmission signal TRS input to the input terminal 231, to obtain the control-command-added audio signal SA3.

The audio-signal-processing device 300D further comprises a frame de-shuffle portion 333, an intra-frame de-shuffle portion 234, and an output terminal 335.

The frame de-shuffle portion 333 receives the control-command-added audio signal SA3 from the decoding portion 332 and, from this audio signal SA3, separates a control command and an audio signal to obtain them, for each audio frame. This frame de-shuffle portion 333 further, for each predetermined number of audio frames, turns back the audio frame to its original position within this predetermined number of audio frames, that is, performs frame de-shuffling based on a control command for controlling processing to be performed by its own processing portion, said control command being included in the separated and obtained control commands. Further, for each audio frame, the frame de-shuffle portion 333 adds all of the separated and obtained control commands except that for the control command for controlling processing to be performed by its own processing portion to the post-processing audio signal, to obtain the control-command-added audio signal SA4 to be output.

The intra-frame shuffle portion 334 receives the control-command-added audio signal SA4 from the frame de-shuffle portion 333 and, from this audio signal SA4, separates a control command and an audio signal to obtain them, for each audio frame. For each audio frame, this intra-frame de-shuffle portion 334 turns back sample data to its original position within the audio frame, that is, performs intra-frame de-shuffling based on a control command for controlling processing to be performed by its own processing portion, said control command being included in the separated and obtained control commands, to generate the output audio signal Aout that corresponds to the above-described input audio signal Ain and output it to the output terminal 335.

The processing portion providing a basis for the above-described frame de-shuffle portion 333 and intra-frame de-shuffle portion 334 is configured much the same way as the above-described processing portion 120 shown in FIG. 3. Each of the processing portions will be further described below individually.

In the frame de-shuffle portion 333, the audio-processing portion (which corresponds to the image-processing portion 122 of FIG. 3) performs frame de-shuffling on the audio signal A1 based on the control command CMDa for controlling processing to be performed its own processing portion. For each audio frame, the control-command-adding portion 124 adds, as the control command CMD, the control command separated by the separation portion 121, that is, the control command CMDb for controlling processing in the intra-frame de-shuffle portion 334 to one frame of the audio signal A2 (which corresponds to the image signal V2) output from the audio-processing portion, to form the control-command-added audio signal SAout (which corresponds to the image signal SVout) to be output.

In the intra-frame de-shuffle portion 334, the audio-processing portion performs intra-frame de-shuffling on the audio signal A1 based on the control command CMDa for controlling processing its own processing portion. Further, in the intra-frame de-shuffle portion 334, the control commands CMD separated and obtained by the separation portion 121 do not include a control command for controlling processing in any other processing portions. Therefore, this intra-frame de-shuffle portion 334 is not provided with the delay portion 123 and the control-command-adding portion 124 and so outputs the audio signal A2 output from the audio-processing portion directly as the audio signal Aout.

The following will describe operations of the audio-signal-processing device 300D shown in FIG. 18. A transmission signal TRS applied to the input terminal 331 is supplied to the decoding portion 332. This decoding portion 332 decodes the transmission signal TRS, to obtain the control-command-added audio signal SA3.

This audio signal SA3 is supplied to the frame de-shuffle portion 333. For each audio frame, this frame de-shuffle portion 333 separates the control commands CMD and the audio signals A1 from this audio signal SA3 to obtain them. For each predetermined number of audio frames, this frame de-shuffle portion 333 turns back the audio frame within this predetermined number of audio frames to its original position, that is, performs frame de-shuffling based on such a control command CMDa of these separated and obtained control commands CMD as to control processing to be performed by its own processing portion. Further, for each audio frame, this frame de-shuffle portion 333 adds to the post-processing audio signal A2 all of the control commands CMD except the control command CMDa, that is, the control commands CMDb for controlling processing to be performed by the other processing portions, to obtain the control-command-added audio signal SA4 to be output.

This audio signal SA4 is supplied to the intra-frame de-shuffle portion 334. For each audio frame, this intra-frame de-shuffle portion 334 separates the control commands CMD and the audio signals A1 from this audio signal SA4 to obtain them. For each audio frame, this intra-frame de-shuffle portion 334 further turns back sample data within the audio frame to its original position, that is, performs intra-frame de-shuffling based on such a command CMDa of these separated and obtained control commands CMD as to control processing to be performed by its own processing portion, to generate the output audio signal Aout that corresponds to the above-described input audio signal Ain. This output audio signal Aout is output to the output terminal 335.

In such a manner, in the audio-signal-processing device 300E shown in FIG. 17, for each audio frame of the input audio signal Ain, the control-command-adding portion 322 adds the control command CMD for controlling processing to be performed by each of the intra-frame shuffle portion 323 and the frame shuffle portion 324, to generate the control-command-added audio signal SA1, so that the intra-frame shuffle portion 323 and the frame shuffle portion 324 respectively process the audio signal based on such a control command of these control commands CMD as to control processing to be performed by its own processing portion. In these processing portions, it is possible to easily change processing for each audio frame or for each predetermined number of audio frames without regarding a timing for supplying the control command to them.

Further, in the audio-signal-processing device 300D shown in FIG. 18, for each frame, the audio signal SA3 output from the decode portion 332 has a control command CMD added to it which controls processing to be performed by each of the frame de-shuffle portion 333 and the intra-frame de-shuffle portion 334, so that the frame de-shuffle portion 333 and the intra-frame de-shuffle portion 334 respectively process the audio signal based on such a control command CMDa of the control commands CMD as to control processing to be performed by its own processing portion. In these processing portions, it is possible to easily change processing for each audio frame or for each predetermined number of audio frames without regarding a timing for supplying the control command to them.

It is to be noted that, although not described above, as a processing unit, a substrate or a large scale integrated circuit (LSI) chip or a device including each of them may be employed.

Further, although in the above embodiments, for each frame of an image signal or for each audio frame of an audio signal, control commands CMD for controlling processing to be performed by a plurality of processing portions have been added, a unit in which this control command CMD is added is not limited to it.

Further, although the above embodiments have been described with reference to a case where control commands CMD for controlling processing to be performed all of a plurality of processing portions have been added, it may also be considered that the control command(s) CMD for controlling processing to be performed only by some of the plurality of processing portion would be added. That is, the control command(s) CMD might as well be added only for such processing portions that processing needs to be changed for each predetermined units, thus eliminating a necessity to add the control command(s) CMD for such processing portions as to perform the same processing always. For example, in the above-described image display device 100 shown in FIG. 1, the IP convert portion 108 performs the same processing for each frame, so that the control commands CMD to be added by the control-command-adding portion 107 need not include such a control command (command 1) for controlling this IP convert portion 108 (see FIGS. 5A-5D).

The present invention makes it possible to well change processing in a predetermined number of units in a predetermined processing portion, thus being applied to use in which processing is performed sequentially by a plurality of processing portions on an information signal such as an image signal or an audio signal.

The present application contains subject matter related to Japanese patent application No. JP 2004-20117, filed in the Japanese Patent Office on Jan. 28, 2004, the entire contents of which being incorporated herein by reference.

Thus have been described the apparatus and the method for processing the information signal. While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for processing an information signal to perform a plurality of processing pieces on the information signal sequentially, the apparatus comprising:
    a plurality of processing portions each for performing the processing piece,
    wherein each of the plurality of processing portions:
        receives a control-command-added information signal comprising an informational signal and a plurality of control commands,
        wherein each of said plurality of control commands is a command that controls processing of a predetermined unit of the information signal by at least one of the plurality of processing portions processing of the information signal;
        processes the predetermined unit of the information signal according to an associated control command relevant to the processing portion; and
        outputs a second control-command-added information signal by adding the plurality of control commands and the processed information signal.

2. The apparatus according to claim 1, further comprising:
a control-command-adding portion for adding to the information signal a control command for controlling a processing piece to be performed by at least one of the processing portions, for each predetermined unit of the information signal, to obtain the control-command-added information signal.

3. The apparatus according to claim 1,
wherein said at least one of the processing portions each comprise:
    separation means for separating a control command and an information signal from the control-command-added information signal; and
    processing means for processing the information signal separated by the separation means, based on the control command, which is separated by the separation means, for controlling a processing piece to be performed by the processing portion itself.

4. The apparatus according to claim 3,
wherein said at least one of the processing portions further comprises:
adding means for adding the control command separated by the separation means to the processed information signal, for each predetermined unit of the information signal, to obtain a control-command-added information signal to be output.

5. The apparatus according to claim 4,
wherein the adding means adds each of a plurality of control commands to the processed information signal,
wherein the adding means does not add the control command controlling the processing means comprising the adding means.

6. The apparatus according to claim 4,
wherein the adding means adds each of a plurality of control commands, separated by the separation means, to the information signal processed by the processing means.

7. The apparatus according to claim 1,
wherein the information signal comprises an image signal,
wherein said at least one of the processing portions comprises a processing portion for generating an image signal for a Picture-in-Picture screen, and
wherein said screen having a different display position for each frame.

8. The apparatus according to claim 1,
wherein the information signal comprises an image signal,
wherein said at least one of the processing portions comprises a processing portion for performing a processing piece to change a pixel position for each frame.

9. A system comprising:
at least one processor; and
at least one memory, coupled to the at least one processor, the at least one memory storing a method for processing an information signal by which a plurality of processing portions sequentially processes the information signal, the method comprising the steps of:
inputting a control-command-added information signal comprising an informational signal and a plurality of control commands,
wherein each of said plurality of control commands is a command that controls processing of a predetermined unit of the information signal by at least one of the plurality of processing portions processing of the information signal;

processing the predetermined unit of the information signal according to an associated control command relevant to the processing portion; and outputting a second control-command-added information signal by adding the plurality of control commands and the processed information signal.

10. An apparatus for processing an information signal, the apparatus comprising:

separation means for separating a plurality of control commands and an information signal from a control-command-added information signal;

processing means for processing a predetermined unit of the information signal according to an associated control command relevant to the processing portion; and adding means for adding the plurality of control commands separated by the separation means to the information signal processed by the processing means to obtain a second control-command-added information signal.

11. A system comprising:

at least one processor; and at least one memory, coupled to the at least one processor, the at least one memory storing a method for processing an information signal, said method comprising:

a separation step for separating a plurality of control commands and an information signal from a control-command-added information signal;

a processing step for processing a predetermined unit of the information signal according to an associated control command relevant to the processing portion; and an adding step for adding the plurality of control commands separated by the separation step to the information signal processed by the processing step to obtain a second control-command-added information signal.

* * * * *

UNITED STATES PATENT AND TRADEMARK OFFICE
CERTIFICATE OF CORRECTION

PATENT NO. : 7,602,442 B2
APPLICATION NO. : 11/044812
DATED : October 13, 2009
INVENTOR(S) : Kondo et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1292 days.

Signed and Sealed this

Fifth Day of October, 2010

David J. Kappos
*Director of the United States Patent and Trademark Office*